US010538174B2

United States Patent
Sun et al.

(10) Patent No.: US 10,538,174 B2
(45) Date of Patent: Jan. 21, 2020

(54) REAL-TIME NONLINEAR RECEDING HORIZON CONTROL OF BATTERIES FOR POWER SYSTEMS

(71) Applicant: NIO USA, Inc., San Jose, CA (US)

(72) Inventors: Fei Sun, San Jose, CA (US); Kamran Turkoglu, Los Gatos, CA (US)

(73) Assignee: NIO USA, Inc., San Jose, CA (US)

( * ) Notice: Subject to any disclaimer, the term of this patent is extended or adjusted under 35 U.S.C. 154(b) by 103 days.

(21) Appl. No.: 15/721,173

(22) Filed: Sep. 29, 2017

(65) Prior Publication Data

US 2019/0100110 A1    Apr. 4, 2019

(51) Int. Cl.
| | | |
|---|---|---|
| B60L 58/12 | (2019.01) | |
| G05B 13/04 | (2006.01) | |
| B60L 3/12 | (2006.01) | |
| B60L 58/16 | (2019.01) | |

(52) U.S. Cl.
CPC ............... *B60L 58/12* (2019.02); *B60L 3/12* (2013.01); *B60L 58/16* (2019.02); *G05B 13/041* (2013.01); *B60L 2260/44* (2013.01)

(58) Field of Classification Search
CPC .......................... B60L 58/16; G05B 13/041
See application file for complete search history.

(56) References Cited

U.S. PATENT DOCUMENTS

| | | | |
|---|---|---|---|
| 8,880,253 B2 | 11/2014 | Li et al. | |
| 9,205,755 B2 | 12/2015 | Lee | |
| 9,244,132 B2 | 1/2016 | Bond et al. | |
| 2017/0177766 A1* | 6/2017 | Song | G06F 17/11 |

OTHER PUBLICATIONS

Toshiyuki Ohtsuka, "Time-variant Receding-Horizon Control of Nonlinear Systems", [online], Journal of Guidance, Control and Dynamics, 1998, vol. 21: 174-176. [retrieved on Mar. 21, 2019]. Retrieved from <http://arc.aiaa.org | DOI: 10.2514/2.4215> (Year: 1998).*
Bryson et al., "Applied Optimal Control," CRC Press, Taylor & Francis Group, 1975, 493 pages, uploaded in five (5) parts.

(Continued)

*Primary Examiner* — Thomas C Lee
*Assistant Examiner* — Charles Cai
(74) *Attorney, Agent, or Firm* — Sheridan Ross P.C.

(57) ABSTRACT

Disclosed herein is a real-time nonlinear receding horizon control methodology for nonlinear battery management system. To increase the life of batteries, the problem is described as a tracking problem and is converted to a nonlinear on-line optimization problem. Different from the previous works, the nonlinear optimal problem is solved directly, without resorting to linearization techniques and/or iterative procedures. Based on the stabilized continuation method, the backward sweep algorithm is implemented to minimize the degradation as well as track the desired trajectory, and the optimal control strategy is integrated in real time. The stability of the systems is guaranteed provided that the horizon length is sufficiently long. Simulation results demonstrates the feasibility of the proposed scheme on nonlinear battery systems. When there are estimation error and model mismatch of the system, the proposed scheme still performs well.

20 Claims, 13 Drawing Sheets

(56) References Cited

OTHER PUBLICATIONS

Doyle et al., "Analysis of capacity-rate data for lithium batteries using simplified models of the discharge process," Journal of Applied Electrochemistry, 1997, vol. 27(7), pp. 846-856.
Fortenbacher et al., "Modeling, Identification, and Optimal Control of Batteries for Power System Applications," 18th Power Systems Computation Conference, Wroclaw, Poland, Aug. 18-22, 2014, 7 pages.
Fortenbacher et al., "Optimal Real-Time Control of Multiple Battery Sets for Power System Applications," PowerTech, 2015 IEEE Eindhoven PowerTech, Jun. 29-Jul. 2, 2015, 6 pages.
Han et al., "Economic Assessment on V2G Frequency Regulation Regarding the Battery Degradation," 2012 IEEE PES Innovative Smart Grid Technologies (ISGT), Jan. 16-20, 2012, pp. 1-6.
Jadbabaie et al., "On the stability of receding horizon control with a general terminal cost," 2005 IEEE Transactions on Automatic Control, vol. 50(5), 7 pages.
Manwell et al., "Lead Acid Battery Storage Model for Hybrid Energy Systems," Solar Energy, 1993, vol. 50(5), pp. 399-405.
Mathieu et al., "Controlling Nonlinear Batteries for Power Systems: Trading Off Performance and Battery Life," IEEE Xplore, 2016 Power systems Computation Conference (PSCC), Genoa, Italy Jun. 20-24, 2016, 7 pages.
Moura et al., "Battery-Health Conscious Power Management in Plug-In Hybrid Electric Vehicles via Electrochemical Modeling and Stochastic Control," IEEE Transactions on Control Systems Technology, 2013, vol. 21(3), pp. 679-694.
Ohtsuka et al., "Real-time Optimization Algorithm for Nonlinear Receding-horizon Control*," Automatica, 1997, vol. 33(6), pp. 1147-1154.
Ohtsuka et al., "Stabilized Continuation Method for Solving Optimal Control Problems," Journal of Guidance, Control, and Dynamics, 1994, vol. 17(5), pp. 950-957.
Ohtsuka, "Time-Variant Receding-Horizon Control of Nonlinear Systems," AIAA Paper 96-3694, AIAA, Guidance, Navigation and Control Conference, San Diego, CA, Jul. 29-31, 1996, pp. 1-7.
Peterson et al., "Lithium-ion battery cell degradation resulting from realistic vehicle and vehicle-to-grid utilization," Journal of Power Sources, 2010, vol. 195(8), pp. 2385-2392.
Peterson et al., "The economics of using plug-in hybrid electric vehicle battery packs for grid storage," Journal of Power Sources, 2010, vol. 195(8), pp. 2377-2384.
White et al., "Using vehicle-to-grid technology for frequency regulation and peak-load reduction," Journal of Power Sources, 2011, vol. 196(8), pp. 3972-3980.

* cited by examiner

REAL-TIME NONLINEAR RECEDING HORIZON CONTROL OF BATTERIES FOR POWER SYSTEMS

FIELD

The present disclosure is generally directed to vehicle systems, in particular, toward electric and/or hybrid-electric vehicles.

BACKGROUND

In recent years, transportation methods have changed substantially. This change is due in part to a concern over the limited availability of natural resources, a proliferation in personal technology, and a societal shift to adopt more environmentally friendly transportation solutions. These considerations have encouraged the development of a number of new flexible-fuel vehicles, hybrid-electric vehicles, and electric vehicles.

While these vehicles appear to be new they are generally implemented as a number of traditional subsystems that are merely tied to an alternative power source. In fact, the design and construction of the vehicles is limited to standard frame sizes, shapes, materials, and transportation concepts. Among other things, these limitations fail to take advantage of the benefits of new technology, power sources, and support infrastructure.

With recent advancements in lithium-ion battery technology, the role and use of batteries in devices (such as phones, smart-wrist watches, tablet computers, etc.) have extended tremendously. Moreover, with the movement towards green energy resources, improvements in technology have led to extensive use of batteries in electric cars. From this perspective, not only a state of charge (SOC) and state of health (SOH) of an electric car battery are important problems to tackle, but also the battery control/management problem has become a very important issue. The storage capacity of a battery degrades as it consumes and produces power. Within this context, battery control management systems are mainly used to minimize degradation in order to improve the overall life cycle, and endurance of batteries.

Present methods of increasing the life of a battery focus mainly on reducing the battery degradation process. Based on heuristic rules to minimize battery degradation, contemporary methods conduct economic analyses of electric vehicle battery degradation. In some approaches, a model predictive control (MPC) approach has been employed to deal with the degradation as an economic cost based on a linearized system model. Some approaches develop PID controllers, feedback linearization controllers and sliding controllers to control nonlinear batteries to track ancillary services signals and minimize the degradation. However, such approaches rely on linearization techniques and controllers designed for the linearized representative.

There are many contemporary methods dedicated to solving the battery control problem ranging from model predictive control to optimal real-time control. In such methods, utilized models range from models operating in linear fashion to somewhat complex nonlinear systems and concentrate on the battery control/management problem with linear control routines.

Portions of the disclosure relate to the following materials which are each incorporated herein by reference for all that they disclose: Arthur Earl Bryson, Applied optimal control: optimization, estimation and control, CRC Press, 1975 ("Bryson"); James F Manwell and Jon G McGowan, Lead acid battery storage model for hybrid energy systems, Solar Energy, 50(5), 399-405, 1993 ("Manwell"); Johanna L Mathieu and Joshua A Taylor, Controlling nonlinear batteries for power systems: Trading off performance and battery life, In 2016 Power Systems Computation Conference, pages 1-7, IEEE, 2016 ("Mathieu"); and Toshiyuki Ohtsuka, Time-variant receding-horizon control of nonlinear systems, Journal of Guidance, Control, and Dynamics, 21(1):174-176, 1998 ("Ohtsuka").

DETAILED DESCRIPTION

Disclosed herein are methods and systems which concentrate on the real-time battery management control of explicit nonlinear battery dynamics. Disclosed herein are methods and systems which inherit nonlinear battery model dynamics, as defined in following sections, but put emphasis on the real-time control aspect of the problem. Given nonlinear dynamics of the problem, it is possible to implement real-time nonlinear receding horizon control strategies in battery control/management and/or degradation dynamics. Disclosed herein are methods and systems utilizing a noniterative real-time nonlinear control solution methodology, which may solve battery management problems efficiently and effectively. Successful results of such methodology on nominal nonlinear battery dynamics can be seen as well as uncertain dynamics for robustness studies.

In this work, $R^n$ denotes the n dimensional Euclidean space. For a real matrix M, its transpose and inverse are denoted as $M^T$ and $M^{-1}$, respectively. For matrices X and P, the Euclidean norm of X is denoted by $\|X\|$ and the P-weighted norm of X is denoted by $$\|X\|_P = \sqrt[P]{X^T P X}.$$

$I_n$ represents an identity matrix of dimension n. Given a matrix M, M>0 (M<0) represents that the matrix is positive definite and M<0 represents that the matrix is negative definite.

Embodiments of the present disclosure will be described in connection with a vehicle, and in some embodiments, an electric vehicle, rechargeable electric vehicle, and/or hybrid-electric vehicle and associated systems.

Figure 1:
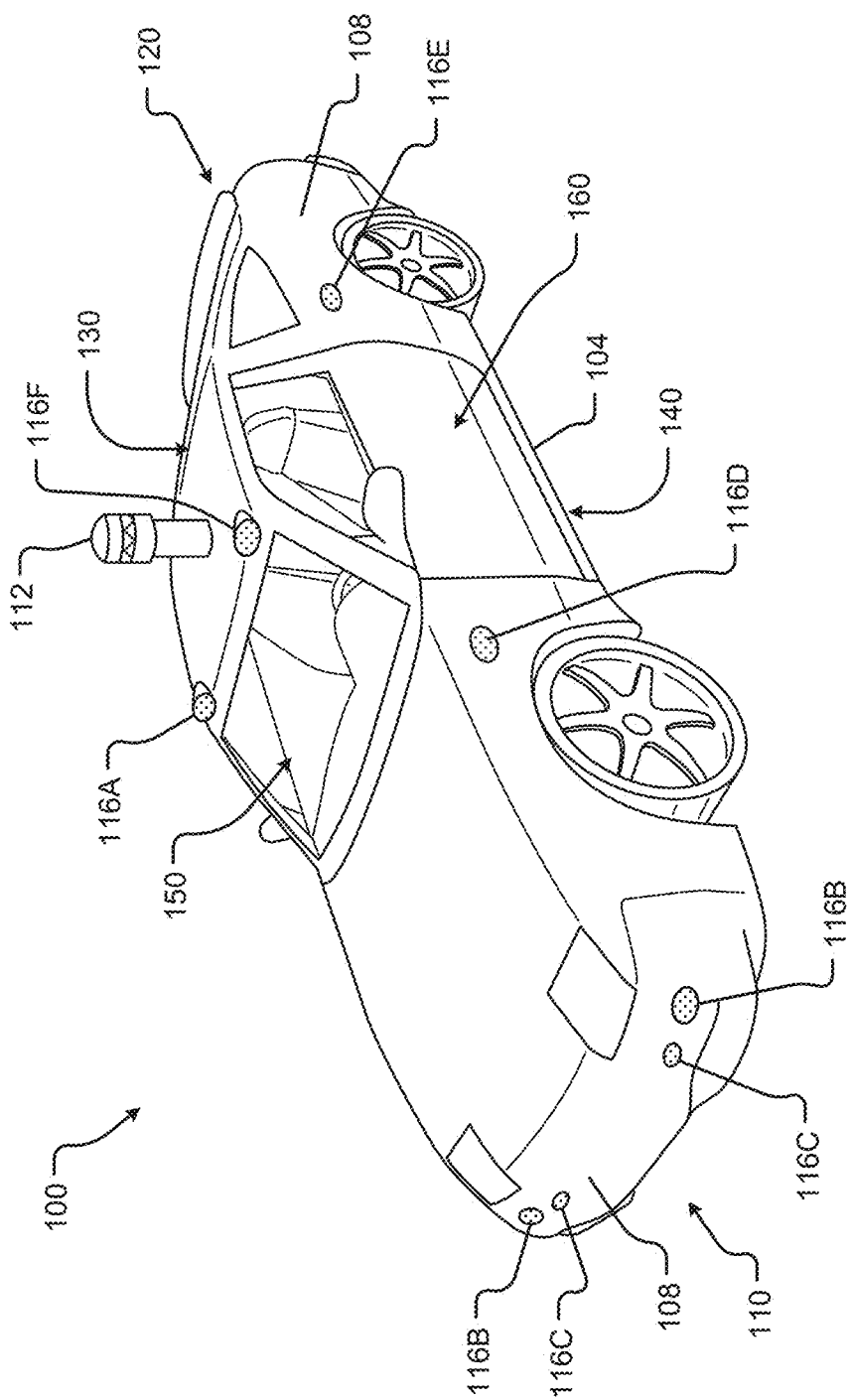
FIG. 1 shows a vehicle in accordance with embodiments of the present disclosure.

FIG. 1 shows a perspective view of a vehicle 100 in accordance with embodiments of the present disclosure. The electric vehicle 100 comprises a vehicle front 110, vehicle aft or rear 120, vehicle roof 130, at least one vehicle side 160, a vehicle undercarriage 140, and a vehicle interior 150. In any event, the vehicle 100 may include a frame 104 and one or more body panels 108 mounted or affixed thereto. The vehicle 100 may include one or more interior components (e.g., components inside an interior space 150, or user space, of a vehicle 100, etc.), exterior components (e.g., components outside of the interior space 150, or user space, of a vehicle 100, etc.), drive systems, controls systems, structural components, etc.

Although shown in the form of a car, it should be appreciated that the vehicle 100 described herein may include any conveyance or model of a conveyance, where the conveyance was designed for the purpose of moving one or more tangible objects, such as people, animals, cargo, and the like. The term "vehicle" does not require that a conveyance moves or is capable of movement. Typical vehicles may include but are in no way limited to cars, trucks, motorcycles, busses, automobiles, trains, railed conveyances, boats, ships, marine conveyances, submarine conveyances, airplanes, space craft, flying machines, human-powered conveyances, and the like.

In some embodiments, the vehicle 100 may include a number of sensors, devices, and/or systems that are capable of assisting in driving operations. Examples of the various sensors and systems may include, but are in no way limited to, one or more cameras (e.g., independent, stereo, combined image, etc.), infrared (IR) sensors, radio frequency (RF) sensors, ultrasonic sensors (e.g., transducers, transceivers, etc.), RADAR sensors (e.g., object-detection sensors and/or systems), LIDAR systems, odometry sensors and/or devices (e.g., encoders, etc.), orientation sensors (e.g., accelerometers, gyroscopes, magnetometer, etc.), navigation sensors and systems (e.g., GPS, etc.), and other ranging, imaging, and/or object-detecting sensors. The sensors may be disposed in an interior space 150 of the vehicle 100 and/or on an outside of the vehicle 100. In some embodiments, the sensors and systems may be disposed in one or more portions of a vehicle 100 (e.g., the frame 104, a body panel, a compartment, etc.).

The vehicle sensors and systems may be selected and/or configured to suit a level of operation associated with the vehicle 100. Among other things, the number of sensors used in a system may be altered to increase or decrease information available to a vehicle control system (e.g., affecting control capabilities of the vehicle 100). Additionally, or alternatively, the sensors and systems may be part of one or more advanced driver assistance systems (ADAS) associated with a vehicle 100. In any event, the sensors and systems may be used to provide driving assistance at any level of operation (e.g., from fully-manual to fully-autonomous operations, etc.) as described herein.

The various levels of vehicle control and/or operation can be described as corresponding to a level of autonomy associated with a vehicle 100 for vehicle driving operations. For instance, at Level 0, or fully-manual driving operations, a driver (e.g., a human driver) may be responsible for all the driving control operations (e.g., steering, accelerating, braking, etc.) associated with the vehicle. Level 0 may be referred to as a "No Automation" level. At Level 1, the vehicle may be responsible for a limited number of the driving operations associated with the vehicle, while the driver is still responsible for most driving control operations. An example of a Level 1 vehicle may include a vehicle in which the throttle control and/or braking operations may be controlled by the vehicle (e.g., cruise control operations, etc.). Level 1 may be referred to as a "Driver Assistance" level. At Level 2, the vehicle may collect information (e.g., via one or more driving assistance systems, sensors, etc.) about an environment of the vehicle (e.g., surrounding area, roadway, traffic, ambient conditions, etc.) and use the collected information to control driving operations (e.g., steering, accelerating, braking, etc.) associated with the vehicle. In a Level 2 autonomous vehicle, the driver may be required to perform other aspects of driving operations not controlled by the vehicle. Level 2 may be referred to as a "Partial Automation" level. It should be appreciated that Levels 0-2 all involve the driver monitoring the driving operations of the vehicle.

At Level 3, the driver may be separated from controlling all the driving operations of the vehicle except when the vehicle makes a request for the operator to act or intervene in controlling one or more driving operations. In other words, the driver may be separated from controlling the vehicle unless the driver is required to take over for the vehicle. Level 3 may be referred to as a "Conditional Automation" level. At Level 4, the driver may be separated from controlling all the driving operations of the vehicle and the vehicle may control driving operations even when a user fails to respond to a request to intervene. Level 4 may be referred to as a "High Automation" level. At Level 5, the vehicle can control all the driving operations associated with the vehicle in all driving modes. The vehicle in Level 5 may continually monitor traffic, vehicular, roadway, and/or environmental conditions while driving the vehicle. In Level 5, there is no human driver interaction required in any driving mode. Accordingly, Level 5 may be referred to as a "Full Automation" level. It should be appreciated that in Levels 3-5 the vehicle, and/or one or more automated driving systems associated with the vehicle, monitors the driving operations of the vehicle and the driving environment.

As shown in FIG. 1, the vehicle 100 may, for example, include at least one of a ranging and imaging system 112 (e.g., LIDAR, etc.), an imaging sensor 116A, 116F (e.g., camera, IR, etc.), a radio object-detection and ranging system sensors 116B (e.g., RADAR, RF, etc.), ultrasonic sensors 116C, and/or other object-detection sensors 116D, 116E. In some embodiments, the LIDAR system 112 and/or sensors may be mounted on a roof 130 of the vehicle 100. In one embodiment, the RADAR sensors 116B may be disposed at least at a front 110, aft 120, or side 160 of the vehicle 100. Among other things, the RADAR sensors may be used to monitor and/or detect a position of other vehicles, pedestrians, and/or other objects near, or proximal to, the vehicle 100. While shown associated with one or more areas of a vehicle 100, it should be appreciated that any of the sensors and systems 116A-K, 112 illustrated in FIGS. 1 and 2 may be disposed in, on, and/or about the vehicle 100 in any position, area, and/or zone of the vehicle 100.

Figure 2:
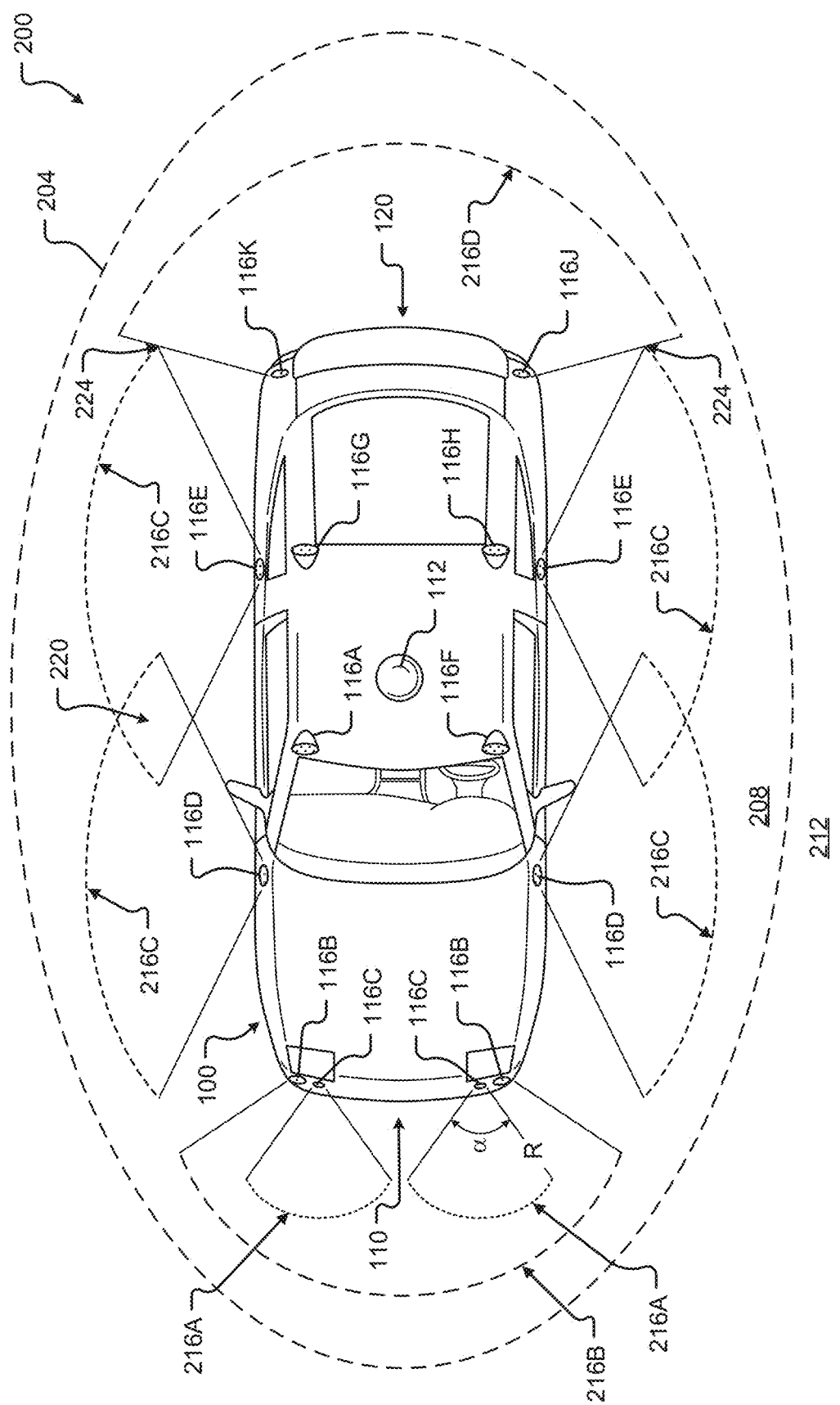
FIG. 2 shows a plan view of the vehicle in accordance with at least some embodiments of the present disclosure.

Referring now to FIG. 2, a plan view of a vehicle 100 will be described in accordance with embodiments of the present disclosure. In particular, FIG. 2 shows a vehicle sensing environment 200 at least partially defined by the sensors and systems 116A-K, 112 disposed in, on, and/or about the vehicle 100. Each sensor 116A-K may include an operational detection range R and operational detection angle α. The operational detection range R may define the effective detection limit, or distance, of the sensor 116A-K. In some cases, this effective detection limit may be defined as a distance from a portion of the sensor 116A-K (e.g., a lens, sensing surface, etc.) to a point in space offset from the sensor 116A-K. The effective detection limit may define a distance, beyond which, the sensing capabilities of the sensor 116A-K deteriorate, fail to work, or are unreliable. In some embodiments, the effective detection limit may define a distance, within which, the sensing capabilities of the sensor 116A-K are able to provide accurate and/or reliable detection information. The operational detection angle α may define at least one angle of a span, or between horizontal and/or vertical limits, of a sensor 116A-K. As can be appreciated, the operational detection limit and the operational detection angle α of a sensor 116A-K together may define the effective detection zone 216A-D (e.g., the effective detection area, and/or volume, etc.) of a sensor 116A-K.

In some embodiments, the vehicle 100 may include a ranging and imaging system 112 such as LIDAR, or the like. The ranging and imaging system 112 may be configured to detect visual information in an environment surrounding the vehicle 100. The visual information detected in the environment surrounding the ranging and imaging system 112 may be processed (e.g., via one or more sensor and/or system processors, etc.) to generate a complete 360-degree view of an environment 200 around the vehicle. The ranging and imaging system 112 may be configured to generate changing 360-degree views of the environment 200 in real-time, for instance, as the vehicle 100 drives. In some cases, the ranging and imaging system 112 may have an effective detection limit 204 that is some distance from the center of the vehicle 100 outward over 360 degrees. The effective detection limit 204 of the ranging and imaging system 112 defines a view zone 208 (e.g., an area and/or volume, etc.) surrounding the vehicle 100. Any object falling outside of the view zone 208 is in the undetected zone 212 and would not be detected by the ranging and imaging system 112 of the vehicle 100.

Sensor data and information may be collected by one or more sensors or systems 116A-K, 112 of the vehicle 100 monitoring the vehicle sensing environment 200. This information may be processed (e.g., via a processor, computer-vision system, etc.) to determine targets (e.g., objects, signs, people, markings, roadways, conditions, etc.) inside one or more detection zones 208, 216A-D associated with the vehicle sensing environment 200. In some cases, information from multiple sensors 116A-K may be processed to form composite sensor detection information. For example, a first sensor 116A and a second sensor 116F may correspond to a first camera 116A and a second camera 116F aimed in a forward traveling direction of the vehicle 100. In this example, images collected by the cameras 116A, 116F may be combined to form stereo image information. This composite information may increase the capabilities of a single sensor in the one or more sensors 116A-K by, for example, adding the ability to determine depth associated with targets in the one or more detection zones 208, 216A-D. Similar image data may be collected by rear view cameras (e.g., sensors 116G, 116H) aimed in a rearward traveling direction vehicle 100.

In some embodiments, multiple sensors 116A-K may be effectively joined to increase a sensing zone and provide increased sensing coverage. For instance, multiple RADAR sensors 116B disposed on the front 110 of the vehicle may be joined to provide a zone 216B of coverage that spans across an entirety of the front 110 of the vehicle. In some cases, the multiple RADAR sensors 116B may cover a detection zone 216B that includes one or more other sensor detection zones 216A. These overlapping detection zones may provide redundant sensing, enhanced sensing, and/or provide greater detail in sensing within a particular portion (e.g., zone 216A) of a larger zone (e.g., zone 216B). Additionally or alternatively, the sensors 116A-K of the vehicle 100 may be arranged to create a complete coverage, via one or more sensing zones 208, 216A-D around the vehicle 100. In some areas, the sensing zones 216C of two or more sensors 116D, 116E may intersect at an overlap zone 220. In some areas, the angle and/or detection limit of two or more sensing zones 216C, 216D (e.g., of two or more sensors 116E, 116J, 116K) may meet at a virtual intersection point 224.

The vehicle 100 may include a number of sensors 116E, 116G, 116H, 116J, 116K disposed proximal to the rear 120 of the vehicle 100. These sensors can include, but are in no way limited to, an imaging sensor, camera, IR, a radio object-detection and ranging sensors, RADAR, RF, ultrasonic sensors, and/or other object-detection sensors. Among other things, these sensors 116E, 116G, 116H, 116J, 116K may detect targets near or approaching the rear of the vehicle 100. For example, another vehicle approaching the rear 120 of the vehicle 100 may be detected by one or more of the ranging and imaging system (e.g., LIDAR) 112, rear-view cameras 116G, 116H, and/or rear facing RADAR sensors 116J, 116K. As described above, the images from the rear-view cameras 116G, 116H may be processed to generate a stereo view (e.g., providing depth associated with an object or environment, etc.) for targets visible to both cameras 116G, 116H. As another example, the vehicle 100 may be driving and one or more of the ranging and imaging system 112, front-facing cameras 116A, 116F, front-facing RADAR sensors 116B, and/or ultrasonic sensors 116C may detect targets in front of the vehicle 100. This approach may provide critical sensor information to a vehicle control system in at least one of the autonomous driving levels described above. For instance, when the vehicle 100 is driving autonomously (e.g., Level 3, Level 4, or Level 5) and detects other vehicles stopped in a travel path, the sensor detection information may be sent to the vehicle control system of the vehicle 100 to control a driving operation (e.g., braking, decelerating, etc.) associated with the vehicle 100 (in this example, slowing the vehicle 100 as to avoid colliding with the stopped other vehicles). As yet another example, the vehicle 100 may be operating and one or more of the ranging and imaging system 112, and/or the side-facing sensors 116D, 116E (e.g., RADAR, ultrasonic, camera, combinations thereof, and/or other type of sensor), may detect targets at a side of the vehicle 100. It should be appreciated that the sensors 116A-K may detect a target that is both at a side 160 and a front 110 of the vehicle 100 (e.g., disposed at a diagonal angle to a centerline of the vehicle 100 running from the front 110 of the vehicle 100 to the rear 120 of the vehicle). Additionally or alternatively, the sensors 116A-K may detect a target that is both, or simultaneously, at a side 160 and a rear 120 of the vehicle 100 (e.g., disposed at a diagonal angle to the centerline of the vehicle 100).

Figure 3:
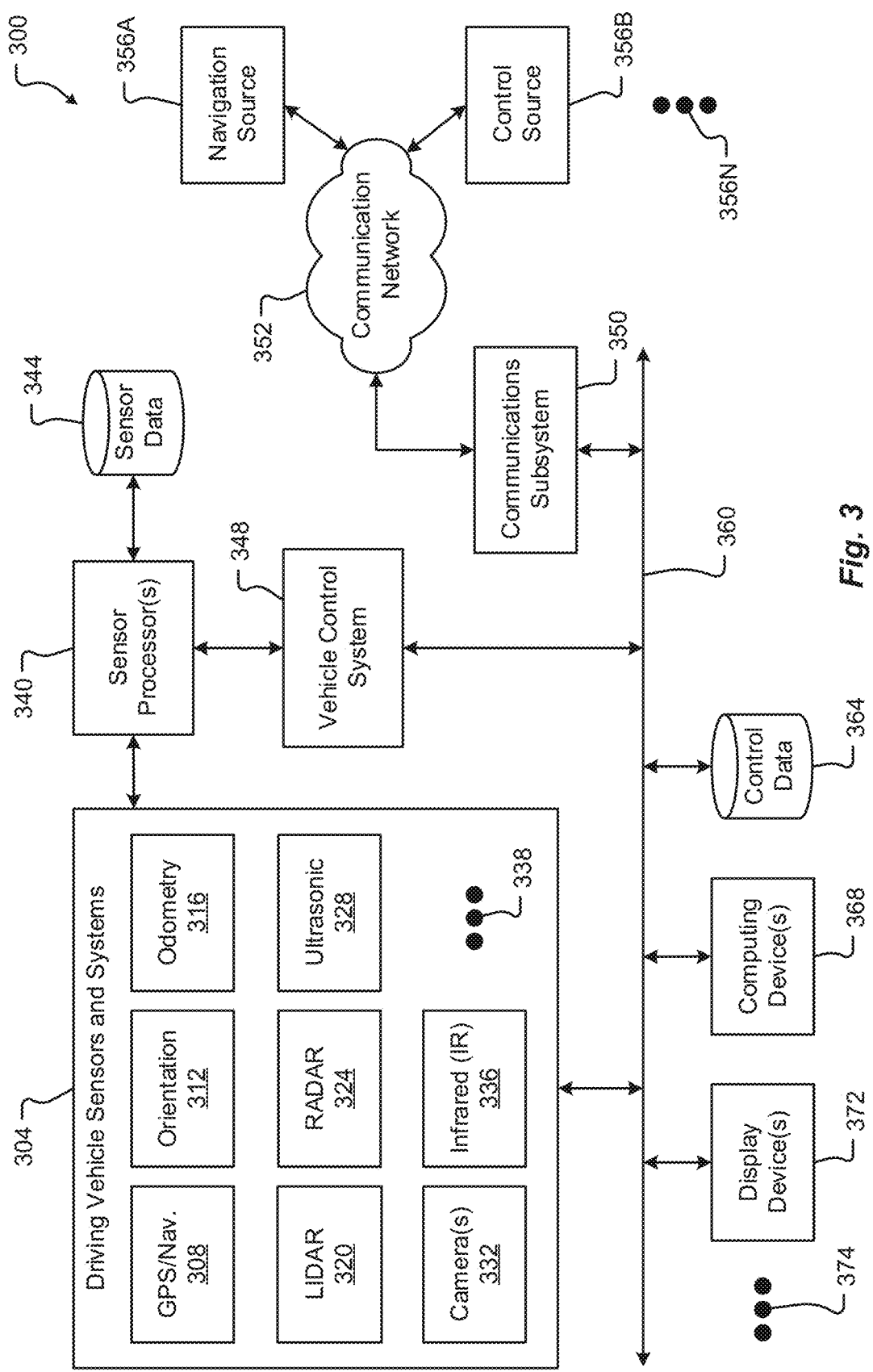
FIG. 3 is a block diagram of an embodiment of a communication environment of the vehicle in accordance with embodiments of the present disclosure.

FIG. 3 is a block diagram of an embodiment of a communication environment 300 of the vehicle 100 in accordance with embodiments of the present disclosure. The communication system 300 may include one or more vehicle driving vehicle sensors and systems 304, sensor processors 340, sensor data memory 344, vehicle control system 348, communications subsystem 350, control data 364, computing devices 368, display devices 372, and other components 374 that may be associated with a vehicle 100. These associated components may be electrically and/or communicatively coupled to one another via at least one bus 360. In some embodiments, the one or more associated components may send and/or receive signals across a communication network 352 to at least one of a navigation source 356A, a control source 356B, or some other entity 356N.

In accordance with at least some embodiments of the present disclosure, the communication network 352 may comprise any type of known communication medium or collection of communication media and may use any type of protocols, such as SIP, TCP/IP, SNA, IPX, AppleTalk, and the like, to transport messages between endpoints. The communication network 352 may include wired and/or wireless communication technologies. The Internet is an example of the communication network 352 that constitutes an Internet Protocol (IP) network consisting of many computers, computing networks, and other communication devices located all over the world, which are connected through many telephone systems and other means. Other examples of the communication network 352 include, without limitation, a standard Plain Old Telephone System (POTS), an Integrated Services Digital Network (ISDN), the Public Switched Telephone Network (PSTN), a Local Area Network (LAN), such as an Ethernet network, a Token-Ring network and/or the like, a Wide Area Network (WAN), a virtual network, including without limitation a virtual private network ("VPN"); the Internet, an intranet, an extranet, a cellular network, an infra-red network; a wireless network (e.g., a network operating under any of the IEEE 802.9 suite of protocols, the Bluetooth® protocol known in the art, and/or any other wireless protocol), and any other type of packet-switched or circuit-switched network known in the art and/or any combination of these and/or other networks. In addition, it can be appreciated that the communication network 352 need not be limited to any one network type, and instead may be comprised of a number of different networks and/or network types. The communication network 352 may comprise a number of different communication media such as coaxial cable, copper cable/wire, fiber-optic cable, antennas for transmitting/receiving wireless messages, and combinations thereof.

The driving vehicle sensors and systems 304 may include at least one navigation 308 (e.g., global positioning system (GPS), etc.), orientation 312, odometry 316, LIDAR 320, RADAR 324, ultrasonic 328, camera 332, infrared (IR) 336, and/or other sensor or system 338. These driving vehicle sensors and systems 304 may be similar, if not identical, to the sensors and systems 116A-K, 112 described in conjunction with FIGS. 1 and 2.

The navigation sensor 308 may include one or more sensors having receivers and antennas that are configured to utilize a satellite-based navigation system including a network of navigation satellites capable of providing geolocation and time information to at least one component of the vehicle 100. Examples of the navigation sensor 308 as described herein may include, but are not limited to, at least one of Garmin® GLO™ family of GPS and GLONASS combination sensors, Garmin® GPS 15x™ family of sensors, Garmin® GPS 16x™ family of sensors with high-sensitivity receiver and antenna, Garmin® GPS 18x OEM family of high-sensitivity GPS sensors, Dewetron DEWE-VGPS series of GPS sensors, GlobalSat 1-Hz series of GPS sensors, other industry-equivalent navigation sensors and/or systems, and may perform navigational and/or geolocation functions using any known or future-developed standard and/or architecture.

The orientation sensor 312 may include one or more sensors configured to determine an orientation of the vehicle 100 relative to at least one reference point. In some embodiments, the orientation sensor 312 may include at least one pressure transducer, stress/strain gauge, accelerometer, gyroscope, and/or geomagnetic sensor. Examples of the navigation sensor 308 as described herein may include, but are not limited to, at least one of Bosch Sensortec BMX 160 series low-power absolute orientation sensors, Bosch Sensortec BMX055 9-axis sensors, Bosch Sensortec BMI055 6-axis inertial sensors, Bosch Sensortec BMI160 6-axis inertial sensors, Bosch Sensortec DMF055 9-axis inertial sensors (accelerometer, gyroscope, and magnetometer) with integrated Cortex M0+ microcontroller, Bosch Sensortec BMP280 absolute barometric pressure sensors, Infineon TLV493D-A1B6 3D magnetic sensors, Infineon TLI493D-W1B6 3D magnetic sensors, Infineon TL family of 3D magnetic sensors, Murata Electronics SCC2000 series combined gyro sensor and accelerometer, Murata Electronics SCC1300 series combined gyro sensor and accelerometer, other industry-equivalent orientation sensors and/or systems, and may perform orientation detection and/or determination functions using any known or future-developed standard and/or architecture.

The odometry sensor and/or system 316 may include one or more components that is configured to determine a change in position of the vehicle 100 over time. In some embodiments, the odometry system 316 may utilize data from one or more other sensors and/or systems 304 in determining a position (e.g., distance, location, etc.) of the vehicle 100 relative to a previously measured position for the vehicle 100. Additionally or alternatively, the odometry sensors 316 may include one or more encoders, Hall speed sensors, and/or other measurement sensors/devices configured to measure a wheel speed, rotation, and/or number of revolutions made over time. Examples of the odometry sensor/system 316 as described herein may include, but are not limited to, at least one of Infineon TLE4924/26/27/28C high-performance speed sensors, Infineon TL4941plusC(B) single chip differential Hall wheel-speed sensors, Infineon TL5041plusC Giant Mangnetoresistance (GMR) effect sensors, Infineon TL family of magnetic sensors, EPC Model 25SP Accu-CoderPro™ incremental shaft encoders, EPC Model 30M compact incremental encoders with advanced magnetic sensing and signal processing technology, EPC Model 925 absolute shaft encoders, EPC Model 958 absolute shaft encoders, EPC Model MA36S/MA63S/SA36S absolute shaft encoders, Dynapar™ F18 commutating optical encoder, Dynapar™ HS35R family of phased array encoder sensors, other industry-equivalent odometry sensors and/or systems, and may perform change in position detection and/or determination functions using any known or future-developed standard and/or architecture.

The LIDAR sensor/system 320 may include one or more components configured to measure distances to targets using laser illumination. In some embodiments, the LIDAR sensor/system 320 may provide 3D imaging data of an environment around the vehicle 100. The imaging data may be processed to generate a full 360-degree view of the environment around the vehicle 100. The LIDAR sensor/system 320 may include a laser light generator configured to generate a plurality of target illumination laser beams (e.g., laser light channels). In some embodiments, this plurality of laser beams may be aimed at, or directed to, a rotating reflective surface (e.g., a mirror) and guided outwardly from the LIDAR sensor/system 320 into a measurement environment. The rotating reflective surface may be configured to continually rotate 360 degrees about an axis, such that the plurality of laser beams is directed in a full 360-degree range around the vehicle 100. A photodiode receiver of the LIDAR sensor/system 320 may detect when light from the plurality of laser beams emitted into the measurement environment returns (e.g., reflected echo) to the LIDAR sensor/system 320. The LIDAR sensor/system 320 may calculate, based on a time associated with the emission of light to the detected return of light, a distance from the vehicle 100 to the illuminated target. In some embodiments, the LIDAR sensor/system 320 may generate over 2.0 million points per second and have an effective operational range of at least 100 meters. Examples of the LIDAR sensor/system 320 as described herein may include, but are not limited to, at least one of Velodyne® LiDAR™ HDL-64E 64-channel LIDAR sensors, Velodyne® LiDAR™ HDL-32E 32-channel LIDAR sensors, Velodyne® LiDAR™ PUCK™ VLP-16 16-channel LIDAR sensors, Leica Geosystems Pegasus: Two mobile sensor platform, Garmin® LIDAR-Lite v3 measurement sensor, Quanergy M8 LiDAR sensors, Quanergy S3 solid state LiDAR sensor, LeddarTech® LeddarVU compact solid state fixed-beam LIDAR sensors, other industry-equivalent LIDAR sensors and/or systems, and may perform illuminated target and/or obstacle detection in an environment around the vehicle 100 using any known or future-developed standard and/or architecture.

The RADAR sensors 324 may include one or more radio components that are configured to detect objects/targets in an environment of the vehicle 100. In some embodiments, the RADAR sensors 324 may determine a distance, position, and/or movement vector (e.g., angle, speed, etc.) associated with a target over time. The RADAR sensors 324 may include a transmitter configured to generate and emit electromagnetic waves (e.g., radio, microwaves, etc.) and a receiver configured to detect returned electromagnetic waves. In some embodiments, the RADAR sensors 324 may include at least one processor configured to interpret the returned electromagnetic waves and determine locational properties of targets. Examples of the RADAR sensors 324 as described herein may include, but are not limited to, at least one of Infineon RASIC™ RTN7735PL transmitter and RRN7745PL/46PL receiver sensors, Autoliv ASP Vehicle RADAR sensors, Delphi L2C0051TR 77 GHz ESR Electronically Scanning Radar sensors, Fujitsu Ten Ltd. Automotive Compact 77 GHz 3D Electronic Scan Millimeter Wave Radar sensors, other industry-equivalent RADAR sensors and/or systems, and may perform radio target and/or obstacle detection in an environment around the vehicle 100 using any known or future-developed standard and/or architecture.

The ultrasonic sensors 328 may include one or more components that are configured to detect objects/targets in an environment of the vehicle 100. In some embodiments, the ultrasonic sensors 328 may determine a distance, position, and/or movement vector (e.g., angle, speed, etc.) associated with a target over time. The ultrasonic sensors 328 may include an ultrasonic transmitter and receiver, or transceiver, configured to generate and emit ultrasound waves and interpret returned echoes of those waves. In some embodiments, the ultrasonic sensors 328 may include at least one processor configured to interpret the returned ultrasonic waves and determine locational properties of targets. Examples of the ultrasonic sensors 328 as described herein may include, but are not limited to, at least one of Texas Instruments TIDA-00151 automotive ultrasonic sensor interface IC sensors, MaxBotix® MB8450 ultrasonic proximity sensor, MaxBotix® ParkSonar™-EZ ultrasonic proximity sensors, Murata Electronics MA40H1S-R open-structure ultrasonic sensors, Murata Electronics MA40S4R/S open-structure ultrasonic sensors, Murata Electronics MA58MF14-7N waterproof ultrasonic sensors, other industry-equivalent ultrasonic sensors and/or systems, and may perform ultrasonic target and/or obstacle detection in an environment around the vehicle 100 using any known or future-developed standard and/or architecture.

The camera sensors 332 may include one or more components configured to detect image information associated with an environment of the vehicle 100. In some embodiments, the camera sensors 332 may include a lens, filter, image sensor, and/or a digital image processor. It is an aspect of the present disclosure that multiple camera sensors 332 may be used together to generate stereo images providing depth measurements. Examples of the camera sensors 332 as described herein may include, but are not limited to, at least one of ON Semiconductor® MT9V024 Global Shutter VGA GS CMOS image sensors, Teledyne DALSA Falcon2 camera sensors, CMOSIS CMV50000 high-speed CMOS image sensors, other industry-equivalent camera sensors and/or systems, and may perform visual target and/or obstacle detection in an environment around the vehicle 100 using any known or future-developed standard and/or architecture.

The infrared (IR) sensors 336 may include one or more components configured to detect image information associated with an environment of the vehicle 100. The IR sensors 336 may be configured to detect targets in low-light, dark, or poorly-lit environments. The IR sensors 336 may include an IR light emitting element (e.g., IR light emitting diode (LED), etc.) and an IR photodiode. In some embodiments, the IR photodiode may be configured to detect returned IR light at or about the same wavelength to that emitted by the IR light emitting element. In some embodiments, the IR sensors 336 may include at least one processor configured to interpret the returned IR light and determine locational properties of targets. The IR sensors 336 may be configured to detect and/or measure a temperature associated with a target (e.g., an object, pedestrian, other vehicle, etc.). Examples of IR sensors 336 as described herein may include, but are not limited to, at least one of Opto Diode lead-salt IR array sensors, Opto Diode OD-850 Near-IR LED sensors, Opto Diode SA/SHA727 steady state IR emitters and IR detectors, FLIR® LS microbolometer sensors, FLIR® TacFLIR 380-HD InSb MWIR FPA and HD MWIR thermal sensors, FLIR® VOx 640×480 pixel detector sensors, Delphi IR sensors, other industry-equivalent IR sensors and/or systems, and may perform IR visual target and/or obstacle detection in an environment around the vehicle 100 using any known or future-developed standard and/or architecture.

In some embodiments, the driving vehicle sensors and systems 304 may include other sensors 338 and/or combinations of the sensors 308-336 described above. Additionally or alternatively, one or more of the sensors 308-336 described above may include one or more processors configured to process and/or interpret signals detected by the one or more sensors 308-336. In some embodiments, the processing of at least some sensor information provided by the vehicle sensors and systems 304 may be processed by at least one sensor processor 340. Raw and/or processed sensor data may be stored in a sensor data memory 344 storage medium. In some embodiments, the sensor data memory 344 may store instructions used by the sensor processor 340 for processing sensor information provided by the sensors and systems 304. In any event, the sensor data memory 344 may be a disk drive, optical storage device, solid-state storage device such as a random access memory ("RAM") and/or a read-only memory ("ROM"), which can be programmable, flash-updateable, and/or the like.

The vehicle control system 348 may receive processed sensor information from the sensor processor 340 and determine to control an aspect of the vehicle 100. Controlling an aspect of the vehicle 100 may include presenting information via one or more display devices 372 associated with the vehicle, sending commands to one or more computing devices 368 associated with the vehicle, and/or controlling a driving operation of the vehicle. In some embodiments, the vehicle control system 348 may correspond to one or more computing systems that control driving operations of the vehicle 100 in accordance with the Levels of driving autonomy described above. In one embodiment, the vehicle control system 348 may operate a speed of the vehicle 100 by controlling an output signal to the accelerator and/or braking system of the vehicle. In this example, the vehicle control system 348 may receive sensor data describing an environment surrounding the vehicle 100 and, based on the sensor data received, determine to adjust the acceleration, power output, and/or braking of the vehicle 100. The vehicle control system 348 may additionally control steering and/or other driving functions of the vehicle 100.

The vehicle control system 348 may communicate, in real-time, with the driving sensors and systems 304 forming a feedback loop. In particular, upon receiving sensor information describing a condition of targets in the environment surrounding the vehicle 100, the vehicle control system 348 may autonomously make changes to a driving operation of the vehicle 100. The vehicle control system 348 may then receive subsequent sensor information describing any change to the condition of the targets detected in the environment as a result of the changes made to the driving operation. This continual cycle of observation (e.g., via the sensors, etc.) and action (e.g., selected control or non-control of vehicle operations, etc.) allows the vehicle 100 to operate autonomously in the environment.

In some embodiments, the one or more components of the vehicle 100 (e.g., the driving vehicle sensors 304, vehicle control system 348, display devices 372, etc.) may communicate across the communication network 352 to one or more entities 356A-N via a communications subsystem 350 of the vehicle 100. Embodiments of the communications subsystem 350 are described in greater detail in conjunction with FIG. 5. For instance, the navigation sensors 308 may receive global positioning, location, and/or navigational information from a navigation source 356A. In some embodiments, the navigation source 356A may be a global navigation satellite system (GNSS) similar, if not identical, to NAVSTAR GPS, GLONASS, EU Galileo, and/or the BeiDou Navigation Satellite System (BDS) to name a few.

In some embodiments, the vehicle control system 348 may receive control information from one or more control sources 356B. The control source 356 may provide vehicle control information including autonomous driving control commands, vehicle operation override control commands, and the like. The control source 356 may correspond to an autonomous vehicle control system, a traffic control system, an administrative control entity, and/or some other controlling server. It is an aspect of the present disclosure that the vehicle control system 348 and/or other components of the vehicle 100 may exchange communications with the control source 356 across the communication network 352 and via the communications subsystem 350.

Information associated with controlling driving operations of the vehicle 100 may be stored in a control data memory 364 storage medium. The control data memory 364 may store instructions used by the vehicle control system 348 for controlling driving operations of the vehicle 100, historical control information, autonomous driving control rules, and the like. In some embodiments, the control data memory 364 may be a disk drive, optical storage device, solid-state storage device such as a random access memory ("RAM") and/or a read-only memory ("ROM"), which can be programmable, flash-updateable, and/or the like.

In addition to the mechanical components described herein, the vehicle 100 may include a number of user interface devices. The user interface devices receive and translate human input into a mechanical movement or electrical signal or stimulus. The human input may be one or more of motion (e.g., body movement, body part movement, in two-dimensional or three-dimensional space, etc.), voice, touch, and/or physical interaction with the components of the vehicle 100. In some embodiments, the human input may be configured to control one or more functions of the vehicle 100 and/or systems of the vehicle 100 described herein. User interfaces may include, but are in no way limited to, at least one graphical user interface of a display device, steering wheel or mechanism, transmission lever or button (e.g., including park, neutral, reverse, and/or drive positions, etc.), throttle control pedal or mechanism, brake control pedal or mechanism, power control switch, communications equipment, etc.

Figure 4:
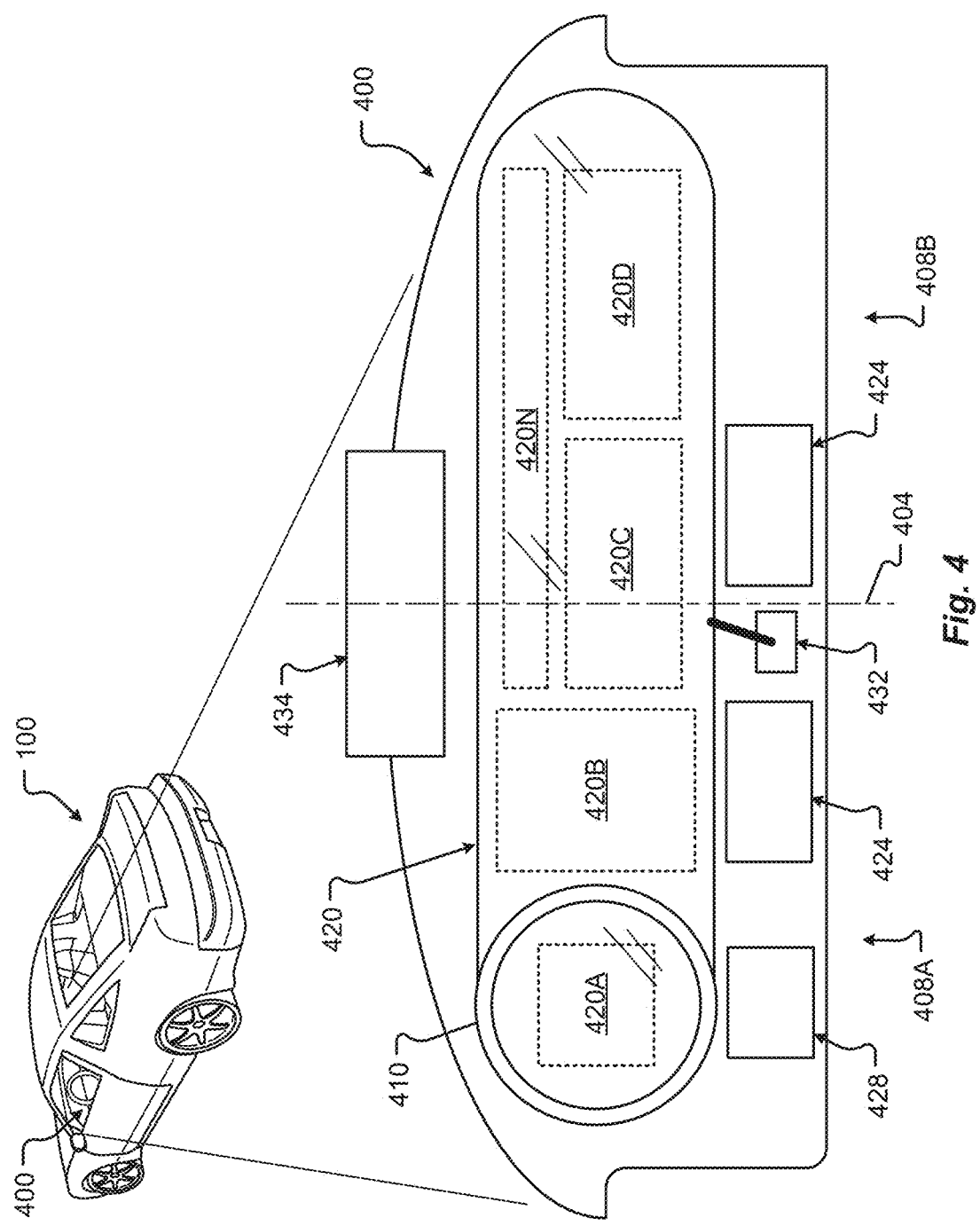
FIG. 4 shows an embodiment of the instrument panel of the vehicle according to one embodiment of the present disclosure.

FIG. 4 shows one embodiment of the instrument panel 400 of the vehicle 100. The instrument panel 400 of vehicle 100 comprises a steering wheel 410, a vehicle operational display 420 (e.g., configured to present and/or display driving data such as speed, measured air resistance, vehicle information, entertainment information, etc.), one or more auxiliary displays 424 (e.g., configured to present and/or display information segregated from the operational display 420, entertainment applications, movies, music, etc.), a heads-up display 434 (e.g., configured to display any information previously described including, but in no way limited to, guidance information such as route to destination, or obstacle warning information to warn of a potential collision, or some or all primary vehicle operational data such as speed, resistance, etc.), a power management display 428 (e.g., configured to display data corresponding to electric power levels of vehicle 100, reserve power, charging status, etc.), and an input device 432 (e.g., a controller, touchscreen, or other interface device configured to interface with one or more displays in the instrument panel or components of the vehicle 100. The input device 432 may be configured as a joystick, mouse, touchpad, tablet, 3D gesture capture device, etc.). In some embodiments, the input device 432 may be used to manually maneuver a portion of the vehicle 100 into a charging position (e.g., moving a charging plate to a desired separation distance, etc.).

While one or more of displays of instrument panel 400 may be touch-screen displays, it should be appreciated that the vehicle operational display may be a display incapable of receiving touch input. For instance, the operational display 420 that spans across an interior space centerline 404 and across both a first zone 408A and a second zone 408B may be isolated from receiving input from touch, especially from a passenger. In some cases, a display that provides vehicle operation or critical systems information and interface may be restricted from receiving touch input and/or be configured as a non-touch display. This type of configuration can prevent dangerous mistakes in providing touch input where such input may cause an accident or unwanted control.

In some embodiments, one or more displays of the instrument panel 400 may be mobile devices and/or applications residing on a mobile device such as a smart phone. Additionally or alternatively, any of the information described herein may be presented to one or more portions 420A-N of the operational display 420 or other display 424, 428, 434. In one embodiment, one or more displays of the instrument panel 400 may be physically separated or detached from the instrument panel 400. In some cases, a detachable display may remain tethered to the instrument panel.

The portions 420A-N of the operational display 420 may be dynamically reconfigured and/or resized to suit any display of information as described. Additionally or alternatively, the number of portions 420A-N used to visually present information via the operational display 420 may be dynamically increased or decreased as required, and are not limited to the configurations shown.

Figure 5:
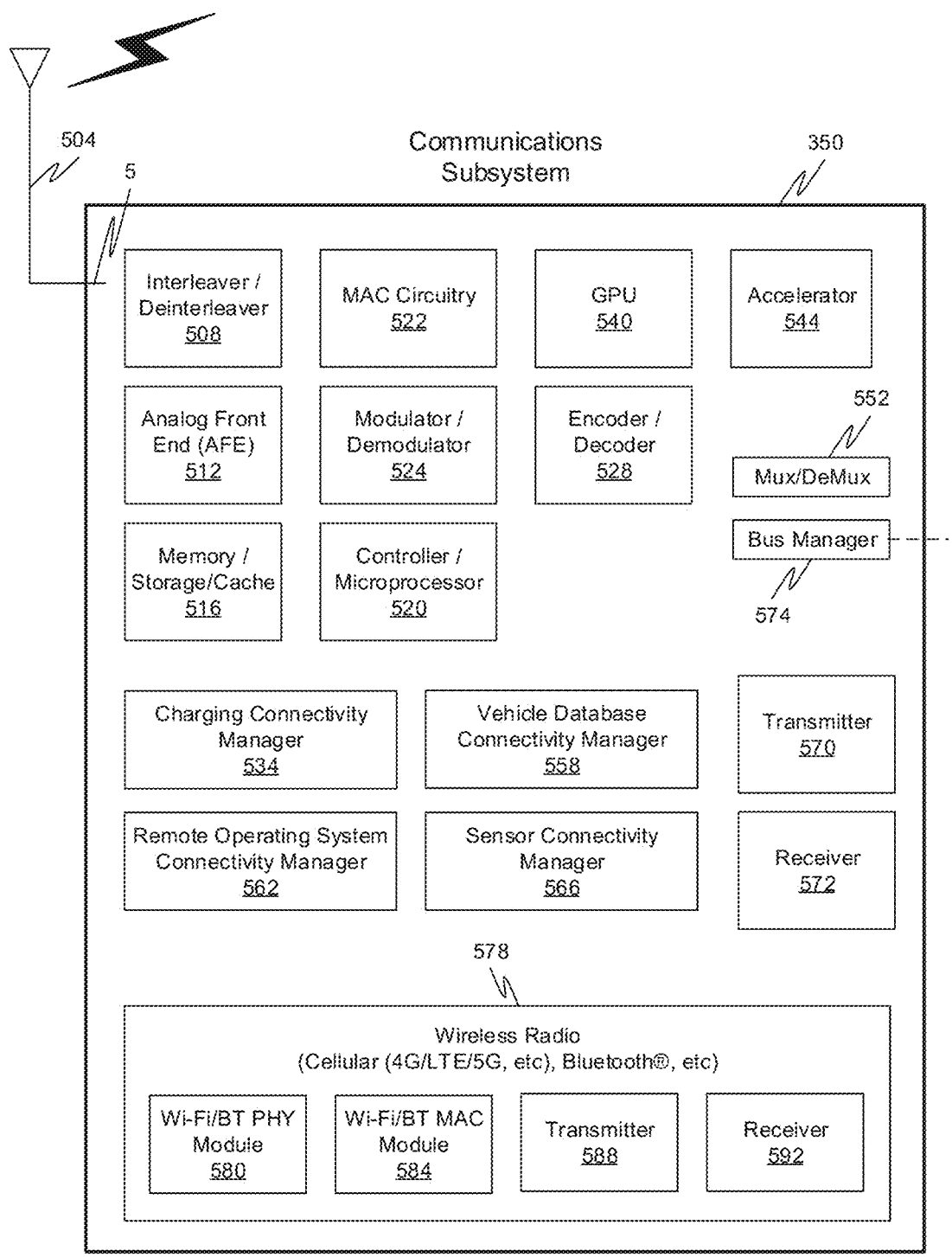
FIG. 5 is a block diagram of an embodiment of a communications subsystem of the vehicle.

FIG. 5 illustrates a hardware diagram of communications componentry that can be optionally associated with the vehicle 100 in accordance with embodiments of the present disclosure.

The communications componentry can include one or more wired or wireless devices such as a transceiver(s) and/or modem that allows communications not only between the various systems disclosed herein but also with other devices, such as devices on a network, and/or on a distributed network such as the Internet and/or in the cloud and/or with other vehicle(s).

The communications subsystem 350 can also include inter- and intra-vehicle communications capabilities such as hotspot and/or access point connectivity for any one or more of the vehicle occupants and/or vehicle-to-vehicle communications.

Additionally, and while not specifically illustrated, the communications subsystem 350 can include one or more communications links (that can be wired or wireless) and/or communications busses (managed by the bus manager 574), including one or more of CANbus, OBD-II, ARCINC 429, Byteflight, CAN (Controller Area Network), D2B (Domestic Digital Bus), FlexRay, DC-BUS, IDB-1394, IEBus, I2C, ISO 9141-1/-2, J1708, J1587, J1850, J1939, ISO 11783, Keyword Protocol 2000, LIN (Local Interconnect Network), MOST (Media Oriented Systems Transport), Multifunction Vehicle Bus, SMARTwireX, SPI, VAN (Vehicle Area Network), and the like or in general any communications protocol and/or standard(s).

The various protocols and communications can be communicated one or more of wirelessly and/or over transmission media such as single wire, twisted pair, fiber optic, IEEE 1394, MIL-STD-1553, MIL-STD-1773, power-line communication, or the like. (All of the above standards and protocols are incorporated herein by reference in their entirety).

As discussed, the communications subsystem 350 enables communications between any if the inter-vehicle systems and subsystems as well as communications with non-collocated resources, such as those reachable over a network such as the Internet.

The communications subsystem 350, in addition to well-known componentry (which has been omitted for clarity), includes interconnected elements including one or more of: one or more antennas 504, an interleaver/deinterleaver 508, an analog front end (AFE) 512, memory/storage/cache 516, controller/microprocessor 520, MAC circuitry 522, modulator/demodulator 524, encoder/decoder 528, a plurality of connectivity managers 534, 558, 562, 566, GPU 540, accelerator 544, a multiplexer/demultiplexer 552, transmitter 570, receiver 572 and wireless radio 578 components such as a Wi-Fi PHY/Bluetooth® module 580, a Wi-Fi/BT MAC module 584, transmitter 588 and receiver 592. The various elements in the device 350 are connected by one or more links/busses 5 (not shown, again for sake of clarity).

The device 350 can have one more antennas 504, for use in wireless communications such as multi-input multi-output (MIMO) communications, multi-user multi-input multi-output (MU-MIMO) communications Bluetooth®, LTE, 4G, 5G, Near-Field Communication (NFC), etc., and in general for any type of wireless communications. The antenna(s) 504 can include, but are not limited to one or more of directional antennas, omnidirectional antennas, monopoles, patch antennas, loop antennas, microstrip antennas, dipoles, and any other antenna(s) suitable for communication transmission/reception. In an exemplary embodiment, transmission/reception using MIMO may require particular antenna spacing. In another exemplary embodiment, MIMO transmission/reception can enable spatial diversity allowing for different channel characteristics at each of the antennas. In yet another embodiment, MIMO transmission/reception can be used to distribute resources to multiple users for example within the vehicle 100 and/or in another vehicle.

Antenna(s) 504 generally interact with the Analog Front End (AFE) 512, which is needed to enable the correct processing of the received modulated signal and signal conditioning for a transmitted signal. The AFE 512 can be functionally located between the antenna and a digital baseband system in order to convert the analog signal into a digital signal for processing and vice-versa.

The subsystem 350 can also include a controller/microprocessor 520 and a memory/storage/cache 516. The subsystem 350 can interact with the memory/storage/cache 516 which may store information and operations necessary for configuring and transmitting or receiving the information described herein. The memory/storage/cache 516 may also be used in connection with the execution of application programming or instructions by the controller/microprocessor 520, and for temporary or long term storage of program instructions and/or data. As examples, the memory/storage/cache 520 may comprise a computer-readable device, RAM, ROM, DRAM, SDRAM, and/or other storage device(s) and media.

The controller/microprocessor 520 may comprise a general purpose programmable processor or controller for executing application programming or instructions related to the subsystem 350. Furthermore, the controller/microprocessor 520 can perform operations for configuring and transmitting/receiving information as described herein. The controller/microprocessor 520 may include multiple processor cores, and/or implement multiple virtual processors. Optionally, the controller/microprocessor 520 may include multiple physical processors. By way of example, the controller/microprocessor 520 may comprise a specially configured Application Specific Integrated Circuit (ASIC) or other integrated circuit, a digital signal processor(s), a controller, a hardwired electronic or logic circuit, a programmable logic device or gate array, a special purpose computer, or the like.

The subsystem 350 can further include a transmitter 570 and receiver 572 which can transmit and receive signals, respectively, to and from other devices, subsystems and/or other destinations using the one or more antennas 504 and/or links/busses. Included in the subsystem 350 circuitry is the medium access control or MAC Circuitry 522. MAC circuitry 522 provides for controlling access to the wireless medium. In an exemplary embodiment, the MAC circuitry 522 may be arranged to contend for the wireless medium and configure frames or packets for communicating over the wired/wireless medium.

The subsystem 350 can also optionally contain a security module (not shown). This security module can contain information regarding but not limited to, security parameters required to connect the device to one or more other devices or other available network(s), and can include WEP or WPA/WPA-2 (optionally+AES and/or TKIP) security access keys, network keys, etc. The WEP security access key is a security password used by Wi-Fi networks. Knowledge of this code can enable a wireless device to exchange information with an access point and/or another device. The information exchange can occur through encoded messages with the WEP access code often being chosen by the network administrator. WPA is an added security standard that is also used in conjunction with network connectivity with stronger encryption than WEP.

In some embodiments, the communications subsystem 350 also includes a GPU 540, an accelerator 544, a Wi-Fi/BT/BLE PHY module 580 and a Wi-Fi/BT/BLE MAC module 584 and wireless transmitter 588 and receiver 592. In some embodiments, the GPU 540 may be a graphics processing unit, or visual processing unit, comprising at least one circuit and/or chip that manipulates and changes memory to accelerate the creation of images in a frame buffer for output to at least one display device. The GPU 540 may include one or more of a display device connection port, printed circuit board (PCB), a GPU chip, a metal-oxide-semiconductor field-effect transistor (MOSFET), memory (e.g., single data rate random-access memory (SDRAM), double data rate random-access memory (DDR) RAM, etc., and/or combinations thereof), a secondary processing chip (e.g., handling video out capabilities, processing, and/or other functions in addition to the GPU chip, etc.), a capacitor, heatsink, temperature control or cooling fan, motherboard connection, shielding, and the like.

The various connectivity managers 534, 558, 562, 566 manage and/or coordinate communications between the subsystem 350 and one or more of the systems disclosed herein and one or more other devices/systems. The connectivity managers 534, 558, 562, 566 include a charging connectivity manager 534, a vehicle database connectivity manager 558, a remote operating system connectivity manager 562, and a sensor connectivity manager 566.

The charging connectivity manager 534 can coordinate not only the physical connectivity between the vehicle 100 and a charging device/vehicle, but can also communicate with one or more of a power management controller, one or more third parties and optionally a billing system(s). As an example, the vehicle 100 can establish communications with the charging device/vehicle to one or more of coordinate interconnectivity between the two (e.g., by spatially aligning the charging receptacle on the vehicle with the charger on the charging vehicle) and optionally share navigation information. Once charging is complete, the amount of charge provided can be tracked and optionally forwarded to, for example, a third party for billing. In addition to being able to manage connectivity for the exchange of power, the charging connectivity manager 534 can also communicate information, such as billing information to the charging vehicle and/or a third party. This billing information could be, for example, the owner of the vehicle, the driver/occupant(s) of the vehicle, company information, or in general any information usable to charge the appropriate entity for the power received.

The vehicle database connectivity manager 558 allows the subsystem to receive and/or share information stored in the vehicle database. This information can be shared with other vehicle components/subsystems and/or other entities, such as third parties and/or charging systems. The information can also be shared with one or more vehicle occupant devices, such as an app (application) on a mobile device the driver uses to track information about the vehicle 100 and/or a dealer or service/maintenance provider. In general, any information stored in the vehicle database can optionally be shared with any one or more other devices optionally subject to any privacy or confidentially restrictions.

The remote operating system connectivity manager 562 facilitates communications between the vehicle 100 and any one or more autonomous vehicle systems. These communications can include one or more of navigation information, vehicle information, other vehicle information, weather information, occupant information, or in general any information related to the remote operation of the vehicle 100.

The sensor connectivity manager 566 facilitates communications between any one or more of the vehicle sensors (e.g., the driving vehicle sensors and systems 304, etc.) and any one or more of the other vehicle systems. The sensor connectivity manager 566 can also facilitate communications between any one or more of the sensors and/or vehicle systems and any other destination, such as a service company, app, or in general to any destination where sensor data is needed.

In accordance with one exemplary embodiment, any of the communications discussed herein can be communicated via the conductor(s) used for charging. One exemplary protocol usable for these communications is Power-line communication (PLC). PLC is a communication protocol that uses electrical wiring to simultaneously carry both data, and Alternating Current (AC) electric power transmission or electric power distribution. It is also known as power-line carrier, power-line digital subscriber line (PDSL), mains communication, power-line telecommunications, or power-line networking (PLN). For DC environments in vehicles PLC can be used in conjunction with CAN-bus, LIN-bus over power line (DC-LIN) and DC-BUS.

The communications subsystem can also optionally manage one or more identifiers, such as an IP (internet protocol) address(es), associated with the vehicle and one or other system or subsystems or components therein. These identifiers can be used in conjunction with any one or more of the connectivity managers as discussed herein.

Figure 6:
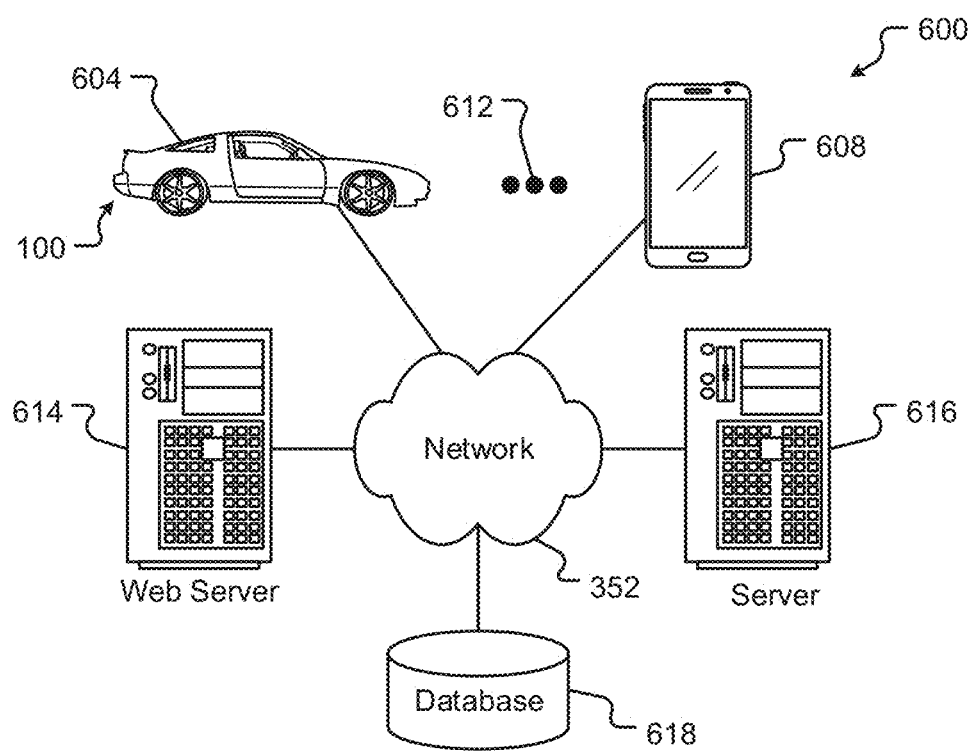
FIG. 6 is a block diagram of a computing environment associated with the embodiments presented herein.

FIG. 6 illustrates a block diagram of a computing environment 600 that may function as the servers, user computers, or other systems provided and described herein. The computing environment 600 includes one or more user computers, or computing devices, such as a vehicle computing device 604, a communication device 608, and/or more 612. The computing devices 604, 608, 612 may include general purpose personal computers (including, merely by way of example, personal computers, and/or laptop computers running various versions of Microsoft Corp.'s Windows® and/or Apple Corp.'s Macintosh® operating systems) and/or workstation computers running any of a variety of commercially-available UNIX® or UNIX-like operating systems. These computing devices 604, 608, 612 may also have any of a variety of applications, including for example, database client and/or server applications, and web browser applications. Alternatively, the computing devices 604, 608, 612 may be any other electronic device, such as a thin-client computer, Internet-enabled mobile telephone, and/or personal digital assistant, capable of communicating via a network 352 and/or displaying and navigating web pages or other types of electronic documents. Although the exemplary computing environment 600 is shown with two computing devices, any number of user computers or computing devices may be supported.

The computing environment 600 may also include one or more servers 614, 616. In this example, server 614 is shown as a web server and server 616 is shown as an application server. The web server 614, which may be used to process requests for web pages or other electronic documents from computing devices 604, 608, 612. The web server 614 can be running an operating system including any of those discussed above, as well as any commercially-available server operating systems. The web server 614 can also run a variety of server applications, including SIP (Session Initiation Protocol) servers, HTTP(s) servers, FTP servers, CGI servers, database servers, Java servers, and the like. In some instances, the web server 614 may publish operations available operations as one or more web services.

The computing environment 600 may also include one or more file and or/application servers 616, which can, in addition to an operating system, include one or more applications accessible by a client running on one or more of the computing devices 604, 608, 612. The server(s) 616 and/or 614 may be one or more general purpose computers capable of executing programs or scripts in response to the computing devices 604, 608, 612. As one example, the server 616, 614 may execute one or more web applications. The web application may be implemented as one or more scripts or programs written in any programming language, such as Java™, C, C#®, or C++, and/or any scripting language, such as Perl, Python, or TCL, as well as combinations of any programming/scripting languages. The application server(s) 616 may also include database servers, including without limitation those commercially available from Oracle®, Microsoft®, Sybase®, IBM® and the like, which can process requests from database clients running on a computing device 604, 608, 612.

The web pages created by the server 614 and/or 616 may be forwarded to a computing device 604, 608, 612 via a web (file) server 614, 616. Similarly, the web server 614 may be able to receive web page requests, web services invocations, and/or input data from a computing device 604, 608, 612 (e.g., a user computer, etc.) and can forward the web page requests and/or input data to the web (application) server 616. In further embodiments, the server 616 may function as a file server. Although for ease of description, FIG. 6 illustrates a separate web server 614 and file/application server 616, those skilled in the art will recognize that the functions described with respect to servers 614, 616 may be performed by a single server and/or a plurality of specialized servers, depending on implementation-specific needs and parameters. The computer systems 604, 608, 612, web (file) server 614 and/or web (application) server 616 may function as the system, devices, or components described in FIGS. 1-6.

The computing environment 600 may also include a database 618. The database 618 may reside in a variety of locations. By way of example, database 618 may reside on a storage medium local to (and/or resident in) one or more of the computers 604, 608, 612, 614, 616. Alternatively, it may be remote from any or all of the computers 604, 608, 612, 614, 616, and in communication (e.g., via the network 352) with one or more of these. The database 618 may reside in a storage-area network ("SAN") familiar to those skilled in the art. Similarly, any necessary files for performing the functions attributed to the computers 604, 608, 612, 614, 616 may be stored locally on the respective computer and/or remotely, as appropriate. The database 618 may be a relational database, such as Oracle 20i®, that is adapted to store, update, and retrieve data in response to SQL-formatted commands.

Figure 7:
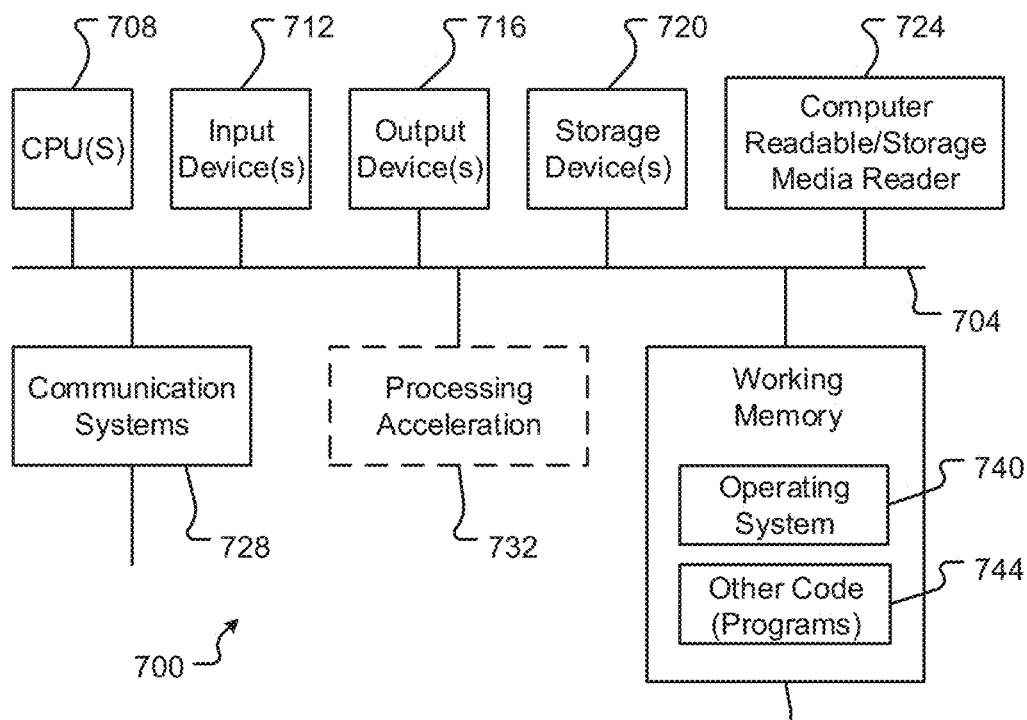
FIG. 7 is a block diagram of a computing device associated with one or more components described herein.

FIG. 7 illustrates one embodiment of a computer system 700 upon which the servers, user computers, computing devices, or other systems or components described above may be deployed or executed. The computer system 700 is shown comprising hardware elements that may be electrically coupled via a bus 704. The hardware elements may include one or more central processing units (CPUs) 708; one or more input devices 712 (e.g., a mouse, a keyboard, etc.); and one or more output devices 716 (e.g., a display device, a printer, etc.). The computer system 700 may also include one or more storage devices 720. By way of example, storage device(s) 720 may be disk drives, optical storage devices, solid-state storage devices such as a random access memory ("RAM") and/or a read-only memory ("ROM"), which can be programmable, flash-updateable and/or the like.

The computer system 700 may additionally include a computer-readable storage media reader 724; a communications system 728 (e.g., a modem, a network card (wireless or wired), an infra-red communication device, etc.); and working memory 736, which may include RAM and ROM devices as described above. The computer system 700 may also include a processing acceleration unit 732, which can include a DSP, a special-purpose processor, and/or the like.

The computer-readable storage media reader 724 can further be connected to a computer-readable storage medium, together (and, optionally, in combination with storage device(s) 720) comprehensively representing remote, local, fixed, and/or removable storage devices plus storage media for temporarily and/or more permanently containing computer-readable information. The communications system 728 may permit data to be exchanged with a network and/or any other computer described above with respect to the computer environments described herein. Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information.

The computer system 700 may also comprise software elements, shown as being currently located within a working memory 736, including an operating system 740 and/or other code 744. It should be appreciated that alternate embodiments of a computer system 700 may have numerous variations from that described above. For example, customized hardware might also be used and/or particular elements might be implemented in hardware, software (including portable software, such as applets), or both. Further, connection to other computing devices such as network input/output devices may be employed.

Examples of the processors 340, 708 as described herein may include, but are not limited to, at least one of Qualcomm® Snapdragon® 800 and 801, Qualcomm® Snapdragon® 620 and 615 with 4G LTE Integration and 64-bit computing, Apple® A7 processor with 64-bit architecture, Apple® M7 motion coprocessors, Samsung® Exynos® series, the Intel® Core™ family of processors, the Intel® Xeon® family of processors, the Intel® Atom™ family of processors, the Intel Itanium® family of processors, Intel® Core® i5-4670K and i7-4770K 22 nm Haswell, Intel® Core® i5-3570K 22 nm Ivy Bridge, the AMD® FX™ family of processors, AMD® FX-4300, FX-6300, and FX-8350 32 nm Vishera, AMD® Kaveri processors, Texas Instruments® Jacinto C6000™ automotive infotainment processors, Texas Instruments® OMAP™ automotive-grade mobile processors, ARM® Cortex™-M processors, ARM® Cortex-A and ARM926EJ-S™ processors, other industry-equivalent processors, and may perform computational functions using any known or future-developed standard, instruction set, libraries, and/or architecture.

Battery Model

For testing embodiments of the disclosure, a kinetic battery model (KiBaM) may be used. For example, some embodiments may be tested using a KiBaM as discussed in Manwell. Furthermore, a nonlinear battery model as proposed in Mathieu may also be used to describe the charge dynamics and the nonlinear degradation process, as follows:

$$\dot{x}_1 = -ax_1 + bx_2 - u$$

$$\dot{x}_2 = ax_1 - bx_2$$

$$\dot{x}_3 = f_d(x_1, x_2, x_3, u)u$$

$$y_1 = f_{ocv}(x_1)u - cu^2 \quad (1)$$

In order to capture the rate capacity effect, two charge capacity wells may be utilized, wherein $x_1$ and $x_2$ are the charges of the wells, respectively. Charge may only be withdrawn from the available well, $x_1$, that is connected with the other well, $x_2$. In addition, $x_3$ denotes the charge capacity of the battery and u is the battery input current. a, b, c are model parameters which are listed in Table I based on an electrochemical lithium-ion battery model. As discussed herein, a battery model as defined in Mathieu may be used.

TABLE I

Parameter Values for The Nonlinear Battery Model

| | | |
|---|---|---|
| a | 9 h$^{-1}$ | Parameter of the available charge well |
| b | 6 h$^{-1}$ | Parameter of the other charge well |
| c | 1.5 mΩ | Resistance |
| $d_1$ | 4.2e-4 h$^{-1}$ | Degradation parameter: S multiplier |
| $d_2$ | 0.37 | Degradation parameter: optimal S |
| $d_3$ | 6.5e-8 h$^{-1}$ | Degradation parameter: u multiplier |
| $e_1$ | 0.005 VAh$^{-1}$ | Open circuit voltage slope |
| $e_2$ | 2.5 V | Open circuit voltage offset |
| Q | 30 Ah | Initial battery charge capacity |

A nonlinear function, $f_d(x_1, x_2, x_3, u)$, characterizes a nonlinear function that is utilized to describe the battery degradation process. The variable $y_1$ may be defined as the power output of a battery where a function $f_{ocv}(x_1)$ may present the open circuit voltage (ocv). The battery state of charge (SOC), S, may be written as follows:

$$S = \frac{x_1 + x_2}{x_3}$$

The nonlinear function $$f_d(x_1, x_2, x_3, u) = d_1(S - d_2)^2 + d_3 u^2$$

as described in Mathieu may be employed such that an assumption may be made that degradation of a battery increases quadratically, where $d_1$, $d_2$, and $d_3$ represent parameters regarding to the degradation process. Open circuit voltage could be a linear or nonlinear function obtained from data, and here we use a linear function to present the open circuit voltage dynamics $$f_{ocv}(x_1) = e_1 x_1 + e_2$$

where parameters $e_1$, $e_2$ are as listed in Table I.

The initial charge capacity $x_3$ of the battery may be given by Q. The physical constraints of the states in such a model may be as follows:

$$x_1 \geq 0$$

$$x_2 \geq 0$$

$$x_3 \geq x_1 + x_2$$

$$x_3 \leq Q \quad (2)$$

The constraint of the input current may be defined as $-200\ A \leq u \leq 200\ A$. For this model, we do not consider the power converter dynamics, charge/discharge inefficiencies, static losses and the impact of temperature on degradation.

In some conventional control methods, a nonlinear normalized battery model which is linearized in order to use a linear optimization framework may be utilized. In contrast, some other conventional control methods explicitly model battery degradation dynamics in a nonlinear function, rather than treating degradation as a cost. In doing so, those other conventional control methods imply that marginal degradation decreases with decreasing charge capacity to ensure the stability of the degradation dynamics.

In the present disclosure the control methodology presented herein does not rely particular forms of any particular specific system model. The control methodology presented herein can be applied to broad classes of general nonlinear functions. In some conventional control methods three controllers are developed to accomplish the aforementioned objectives: namely a PID controller, a feedback linearization based controller and a sliding mode controller. None of these afore mentioned controllers, however, solve the problem directly based on the nonlinear battery model and explicitly included input/state constraints, which is a major drawback of conventional methods.

Real-Time Nonlinear Receding Horizon Control Methodology

In the present disclosure, the battery control and degradation management problem is formulated as a tracking control problem. One of the control objectives in some embodiments may be to drive battery output power to track a desired trajectory, which can be written as $y_1(t) \rightarrow y_r(t)$, where $y_1$ is the battery output power and $y_r(t)$ is the reference trajectory. Another objective may in some embodiments be to minimize the battery degradation by setting $S \to d_2$, and $u \to 0$, wherein S is the battery state of charge, $d_2$ is the optimal battery state of charge, and u is the battery degradation.

The present disclosure utilizes a nonlinear receding horizon control scheme to deal with the nonlinear nature directly, without any existing iteration scheme. The present disclosure solves the explicit nonlinear optimization problem without resorting to any linearization techniques, in real-time.

In order to formulate the problem, the nonlinear battery model presented in Eq. (1) above may be rewritten in a general form as:

$$\begin{cases} \dot{x}(t) = f(x(t), u(t)), \\ y(t) = h(x(t), u), \end{cases} \quad (3)$$

where battery state of charge $x(t) \in \mathbb{R}^n$, battery output power $y(t) \in \mathbb{R}^r$ and control input $u(t) \in \mathbb{R}^m$. The nonlinear function $f(x, u)$ is Lipschitz continuous. The output function $h(x, u)$ could be a linear or nonlinear function. The following optimization problem is designed to generate a real-time optimal control for tracking the desired trajectory as well as reducing the degradation:

Problem-1:

$$u^*(t) = {}_{u(t)}{}^{argmin} J(x(t), y(t), u(t)) \quad (4)$$

subject to Eq. (3). In order to realize the tracking and degradation managing objectives, the corresponding performance index without terminal cost may be designed as follows:

$$J = \int_t^{t+T} L(x(t), y(t), u(t)), \quad (5)$$

$$= \int_t^{t+T} \left( \|y(\tau) - y_r(\tau)\|_{Q_1}^2 + \|S - d_2\|_{Q_2}^2 + \|u(\tau)\|_R^2 \right) d\tau,$$

where $Q_1 > 0$, $Q_2 > 0$ and $R > 0$ are symmetric weighting matrices and T denotes the horizon.

Given the construction of the cost function given in Eq. (5), the battery management problem may be converted into a real-time optimization procedure. For this purpose, the powerful nature of real-time nonlinear receding horizon control algorithm may be utilized to generate the optimal control protocol for an explicit nonlinear model by minimizing the associated cost function. The presented cost function may evaluate the performance from the present time t to the finite future t+T, which means the cost function is minimized for each time segment t starting from x(t). As such, it is possible to convert the present receding horizon control problem into a family of finite horizon optimal control problems on an artificial $\tau$ axis parametrized by time t.

According to the first-order necessary conditions of optimality, a two-point boundary-value problem (TPBVP) may be given by calculating the variations:

$$\lambda^*_\tau(\tau, t) = -H_x^T, \lambda^*(T, t) = 0,$$

$$x^*_\tau(\tau, t) = H_\lambda^T, x^*(0, t) = x(t),$$

$$H_u = 0 \quad (6)$$

where $\lambda \in \mathbb{R}^n$ denotes the co-state and H is the Hamiltonian which is defined as $$H = L + \lambda^{*T} \dot{x} \quad (7)$$

$$= \|y(\tau) - y_r(\tau)\|_{Q_1}^2 + \|S - d_2\|_{Q_2}^2 + \|u(\tau)\|_R^2 + \lambda^{*T} f(x(t), u(t)).$$

The TPBVP may be as discussed in Bryson.

As used in the equations discussed herein, $(\ )^*$ may denote an optimal value of a variable in the optimal control formulation so as to distinguish it from its correspondence in the original problem. $H_x$ may denote the partial derivative of H with respect to x, and so on.

Since the state of charge $x(\tau)$ and costate $\lambda(\tau)$ at $\tau = T$ are determined by the TPBVP in Eq. (6) from the state and costate at $\tau = 0$, the TPBVP may be written as a nonlinear algebraic equation with respect to the costate at $\tau = 0$ as $$F(\lambda(t), x(t), y(t), T, t) = \lambda^*(T, t) = 0, \quad (8)$$

where $\lambda(t)$ denotes the costate at $\tau = 0$. The control protocol may then be given by $$u(t) = \arg\{H_u[x(t), y(t), \lambda(t), u(t)] = 0\}. \quad (9)$$

By this formulation, the optimal control u(t) can be calculated from Eq. (9) based on x(t) and $\lambda(t)$ where the ordinary differential equation of $\lambda(t)$ can be solved numerically from Eq. (8), in real-time, without any need of an iterative optimization routine. Since the nonlinear equation $F(\lambda(t), x(t), y(t), T, t)$ has to be satisfied at any time t, $dF/dt = 0$ holds along the trajectory of the closed-loop system of the receding horizon control. If the horizon T is a smooth function of time t, the solution of $F(\lambda(t), x(t), y(t), T, t)$ can be tracked with respect to time. However, numerical errors associated with the solution may accumulate as the integration proceeds in practice, and therefore some correction techniques are required to correct such errors in the solution. To address this problem, a stabilized continuation method as described in Ohtsuka may be used. Using a stabilized continuation method, it may be possible to rewrite the statement as $$\frac{dF}{dt} = A_s F, \quad (10)$$

where $A_s$ denotes a stable matrix to make the solution converge to zero exponentially.

To evaluate the optimal control by computing derivative of $\lambda(t) = \lambda^*(0, t)$ in real time, the partial differentiation of Eq. (6) may be considered with respect to time t:

$$\delta \dot{x} = f_x \delta x + f_u \delta u,$$

$$\delta \dot{\lambda} = -H_{xx} \delta x - H_{x\lambda} S \lambda - H_{xu} \delta u,$$

$$0 = H_{ux} \delta x + f_u^R \delta \lambda + H_{uu} \delta u. \quad (11)$$

Since $\delta u = -H_{uu}^{-1}(H_{ux} \delta x + f_u^T \delta \lambda)$, it can be written as $$\delta \dot{x} = (f_x f_u H_{uu}^{-1} H_{uu}) \delta x - f_u H_{uu}^{-1} f_u^T \delta \lambda,$$

$$\delta \dot{\lambda} = -(H_{xx} - H_{xu} H_{uu}^{-1} H_{ux}) \delta x - (f_x^T - H_{xu} H_{uu}^{-1} f_u^T) \delta \lambda,$$

which leads to the following form of a linear differential equation:

$$\frac{\partial}{\partial \tau}\begin{bmatrix} x_t^* - x_t^* \\ \lambda_t^* - \lambda_t^* \end{bmatrix} = \begin{bmatrix} A & -B \\ -C & -A^T \end{bmatrix}\begin{bmatrix} x_t^* - x_t^* \\ \lambda_t^* - \lambda_t^* \end{bmatrix} \quad (12)$$

where $$A = f_x - f_u H_{uu}^{-1} H_{ux},$$

$$B = f_u H_{uu}^{-1} f_u^T,$$

$$C = H_{xx} - H_{xu} H_{uu}^{-1} H_{ux},$$

and wherein the matrix $H_{uu}$ is nonsingular.

In order to reduce the computational cost without resorting to any approximation technique, a backward-sweep method may be implemented. The backward-sweep method may be as discussed in Ohtsuka. The derivative of the function $f$ with respect to time may be given by $$\frac{dF}{dt} = \lambda_t^*(T, t) + \lambda_\tau^*(T, t)\frac{dT}{dt}, \quad (13)$$

where $x_\tau^*$ and $\lambda_\tau^*$ are given by (6).

The relationship between the costate and other variables may be assumed as follows:

$$\lambda_t^* - \lambda_\tau^* = S(\tau,t)(x_t^* - x_\tau^*) + c(\tau,t). \quad (14)$$

Given the assumed relationship between the costate and other variables, it follows that $$S(T, t) = 0 \mid_{\tau=T}, \quad (15)$$

$$c(T, t) = H_x^T \mid_{\tau=T}\left(1 + \frac{dT}{dt}\right) + A_s F.$$

Then according to Eq. (14) and Eq. (12), the following differential equations are shown:

$$\frac{\partial S}{\partial \tau} = -A^T S - SA + SBS - C, \quad (16)$$

$$\frac{\partial c}{\partial \tau} = -(A^T - SB)c.$$

Based on (14), the differential equation of the costate to be integrated in real time may be obtained as:

$$\frac{d\lambda(t)}{dt} = -H_x^T + c(0, t). \quad (17)$$

Here, at each time t, the TPBVP equations may be integrated forward along the τ axis, and then Eq. (16) may be integrated backward with the terminal conditions provided in Eq. (15) in order to obtain c(0, t). Next, the differential equation of λ(t) is integrated for one step along the t axis so as to update the optimal controller according to (9). If the matrix $H_{uu}$ is nonsingular, the algorithm may be executable regardless of controllability or stabilizability of the system.

Figure 14:
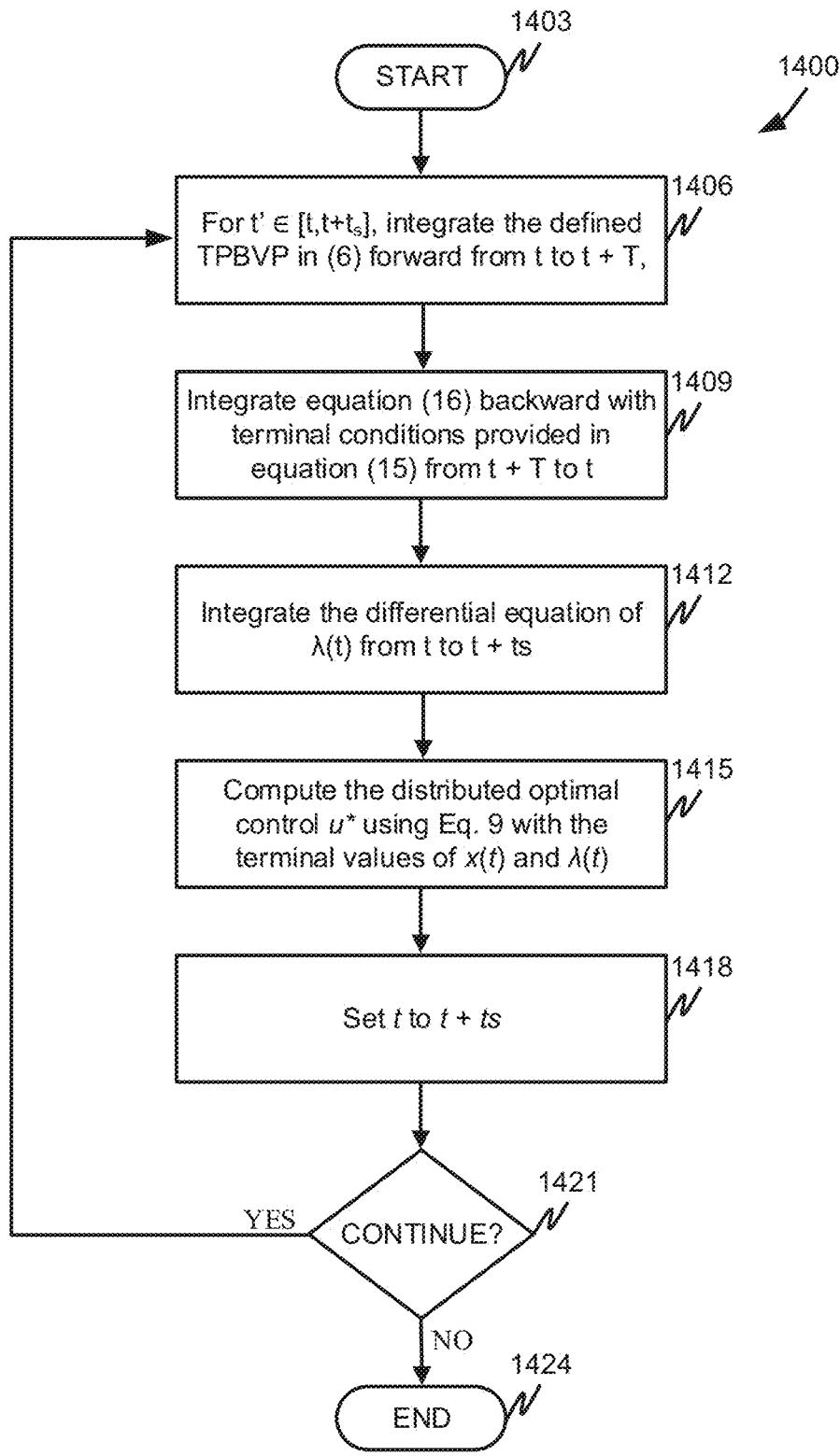
FIG. 14 illustrates a method in accordance with certain embodiments described herein.

The nonlinear receding horizon control method for battery management systems to compute the optimal control u(t) is described below, and illustrated in FIG. 14. For the description, $t_s > 0$ denotes the sampling time. The method 1400 may begin at step 1403 in which a time t is initialized at 0 and initial state x=x(0). In step 1406, for t'ϵ[t, t+$t_s$], the defined TPBVP in Eq. (6) may be integrated forward from t to t+T. In step 1409, Eq. (16) may be integrated backward from t+T to t with the terminal conditions provided in Eq. (15). In step 1412, the differential equation of λ(t), may be integrated from t to t+$t_s$. In step 1415, at time t+$t_s$, the distributed optimal control u* may be computed using Eq. (9) with the terminal values of x(t) and λ(t). At step 1418, t may be set to t+$t_s$, and the method may determine to one of continue or end at step 1421. If the method is determined to continue, the method may comprise returning to step 1406. If the method is determined to end, the method may comprise moving to step 1424 in which the method ends.

In addition, for the nonlinear battery model in Eq. (1), due to the physical constraints on the state variable and control input in Eq. (2), the presented nonlinear receding horizon control scheme may be extended to include inequality constraints which can be written as a general form:

$$G(x,u,t) \geq 0.$$

It follows that the Hamiltonian may be augmented as $$H = L + \lambda^T f + \mu G, \quad (18)$$

where μ is also called costate and $$\mu \begin{cases} > 0, G = 0, \\ = 0, G > 0. \end{cases}$$

Accordingly, the two-point boundary-value problem becomes:

$$\lambda_T \begin{cases} -(L_x + \lambda^T f_x + \mu G_x), G = 0, \\ -(L_x + \lambda^T f_x), G > 0. \end{cases} \quad (19)$$

and $$H_u = L_u + \lambda^T f_u + \mu G_u.$$

Given this formulation, Method 1 still remains applicable to the nonlinear battery system with constraints. When G>0, the original Hamiltonian is used in (i.e. μ=0) to generate the two-point boundary-value problem and implement the backward sweep method. When G=0, the augmented Hamiltonian is utilized in with μ>0 to calculate the two-point boundary-value problem and to compute the optimal controller with the additional condition G(x, u, t)=0.

Corollary-1 Consider the nonlinear battery system given in Eq. (1). In such formulation, there exists a large enough value of horizon T which guarantees the proposed nonlinear receding horizon scheme to remain asymptotically stable.

Although the backward sweep algorithm is executable whether or not the system is stable, with this result, when the optimization horizon is chosen to be sufficiently long, the non-increasing monotonicity of the cost function becomes a sufficient condition for the stability. Therefore, the stability of the multi-agent nonlinear system by the proposed real-time nonlinear receding horizon control method may also be ensured.

Simulation Results

In this section, the validity and feasibility of proposed nonlinear receding horizon control scheme on the nonlinear battery system according to some embodiments are demonstrated. The system model may be as shown in Eq. (1) with the system parameters listed in Table I above. The desired trajectory may be set to be the trajectory of five hours of a normalized PJM regulation signal. Since it's a normalized signal, it is scaled by 400 W in the simulation. The initial states may in the simulation be given as $x_1(0)=8$ Ah, $x_2(0)=8$ Ah and $x_3(0)=30$ Ah. The weighting matrices in the performance index are defined as $Q_1=1000$, $Q_2=1$ and $R=1$. The stable matrix is designed as $A_s=-100I_3$. The horizon T in the performance index is shown as a smooth function of time t:

$$T(t)=T_f(1-e^{-\alpha t}), \quad (20)$$

where $T_f=0.1$ (hour) and $\alpha=0.01$ (hour).

Figure 8:
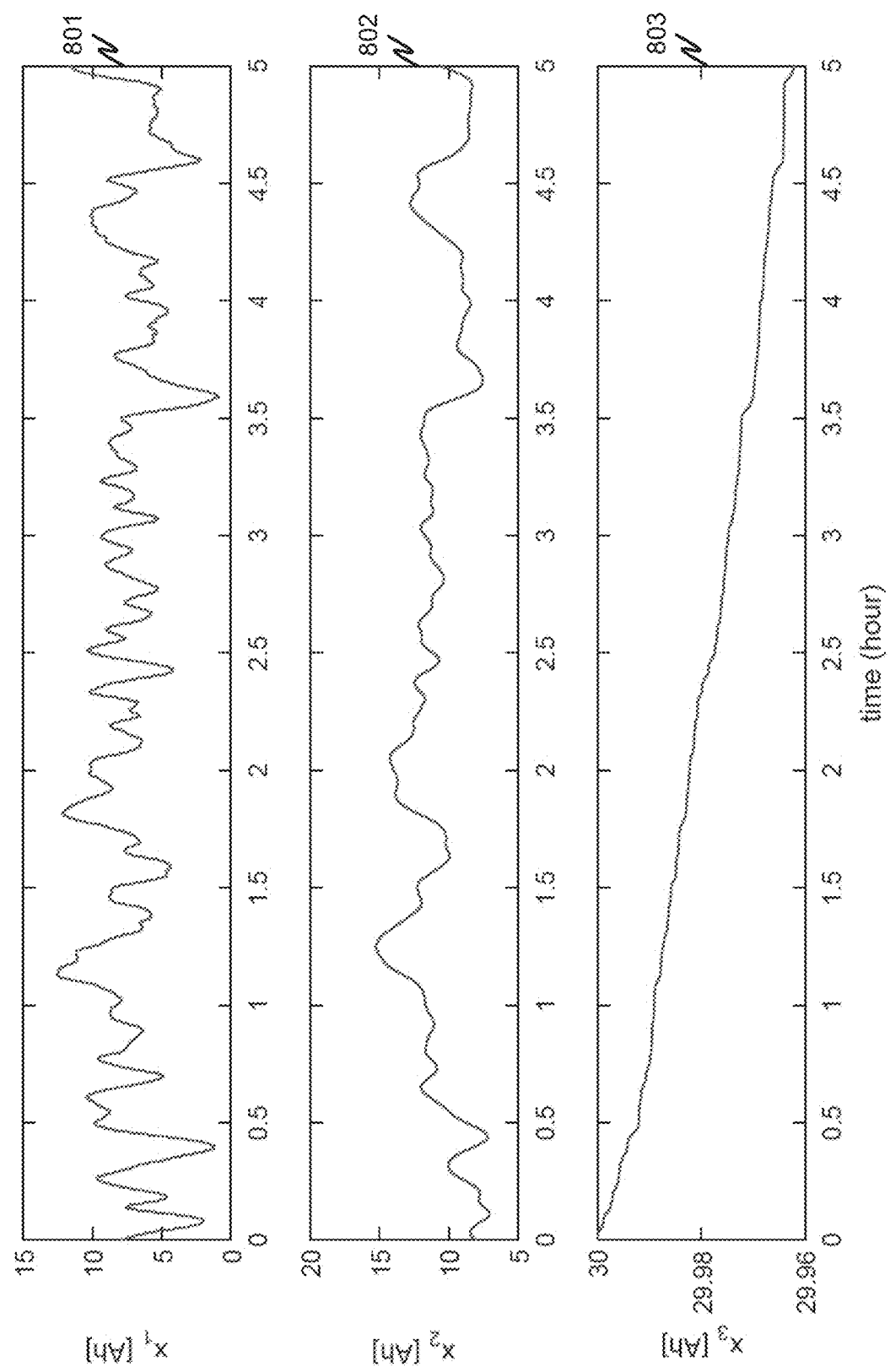
FIG. 8 is a graph in accordance with certain embodiments described herein.

The simulation of such a nonlinear battery system may be implemented in MATLAB, according to the framework presented in Method 1, where the time step on the t axis may be plotted in hours. As illustrated in FIG. 8, the trajectories of states $x_1$, $x_2$, $x_3$ with defined initial conditions may be plotted. In particular, FIG. 8 illustrates the charge in a first charge well, $x_1(t)$, 801, the charge in a second charge well, $x_2(t)$, 802, and the charge in the battery, $x_3(t)$, 803, measured in Amp hours without the introduction of additive disturbances.

Figure 9A:
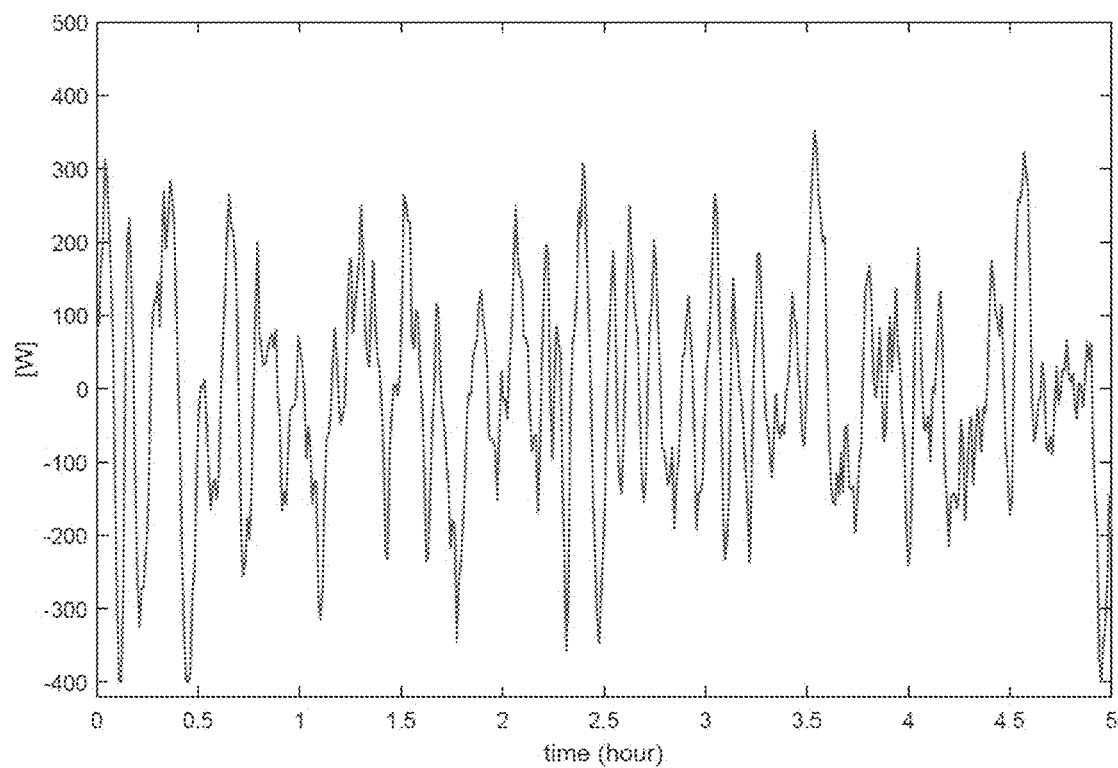
FIG. 9A is a graph in accordance with certain embodiments described herein.
Figure 9B:
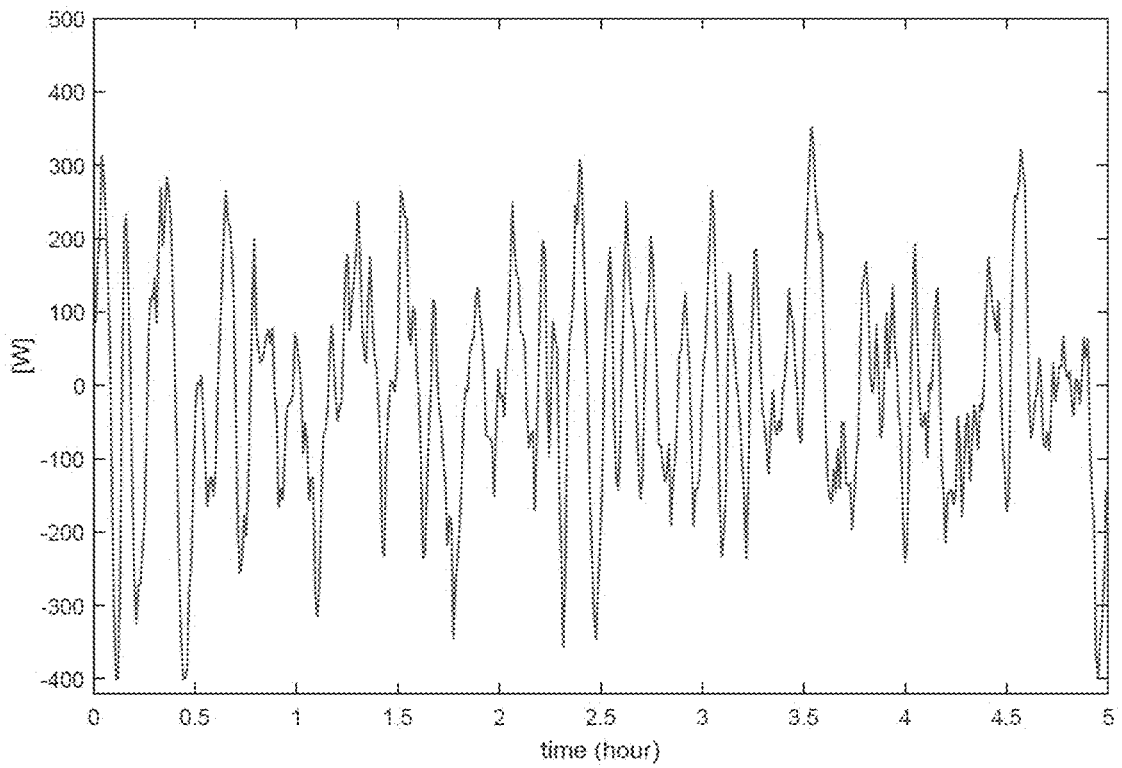
FIG. 9B is a graph in accordance with certain embodiments described herein.

FIG. 9A shows the desired trajectory of the output power, $y_r(t)$, without disturbances. FIG. 9B shows the tracking performance of the realized output power, $y_1(t)$. The similarities of FIG. 9A and FIG. 9B show that actual signal is closely following the desired trajectory successfully.

Figure 10:
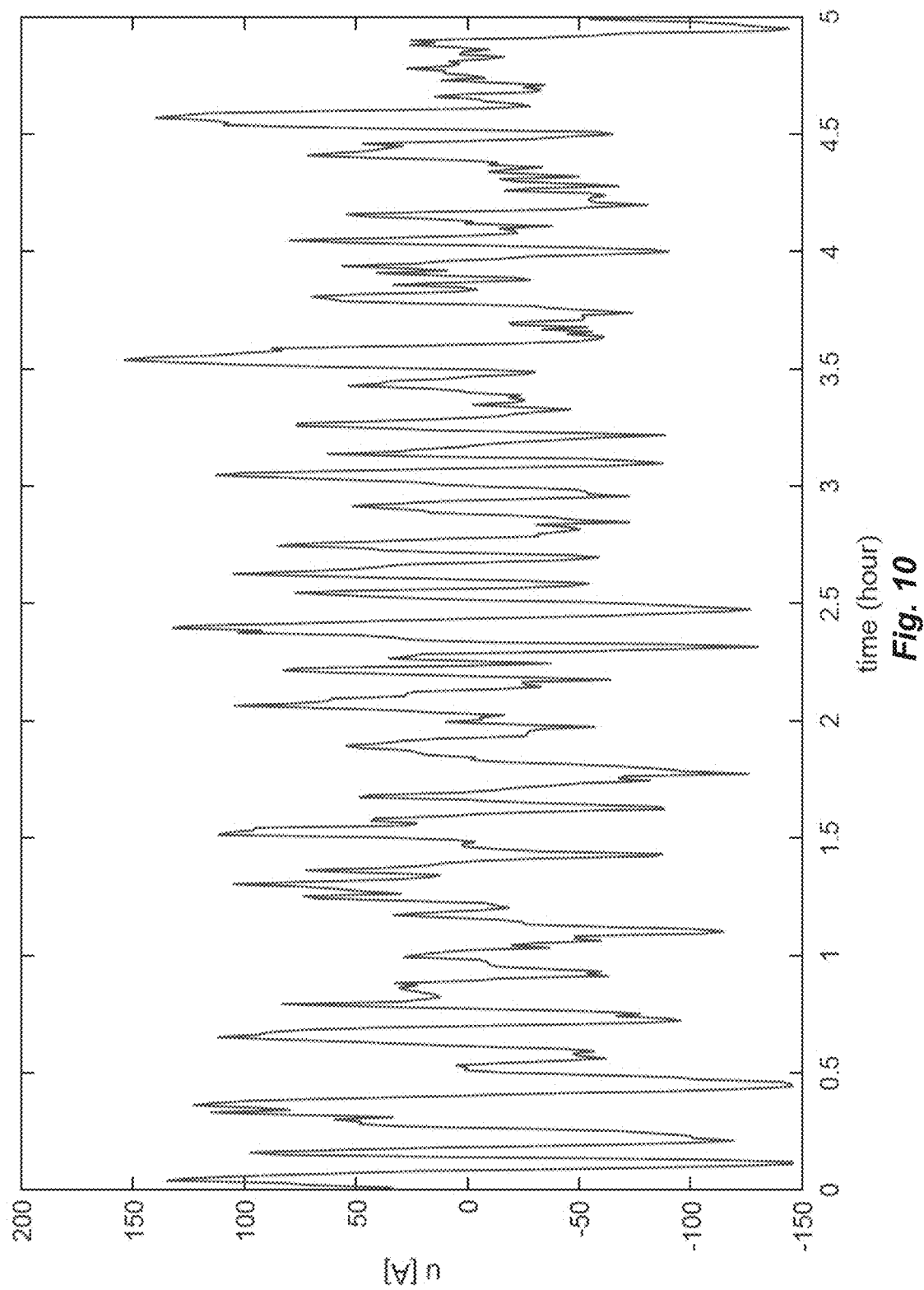
FIG. 10 is a graph in accordance with certain embodiments described herein.

The actual input current u is shown in FIG. 10. FIG. 10 illustrates the input current generated by the real-time nonlinear receding horizon control algorithm without disturbances. This also demonstrates the fact that the physical constraints presented in Eq. (2) are satisfied. It is possible to observe that the proposed real-time nonlinear receding horizon control scheme results in perfect tracking performance as well as reducing the degradation based on the explicit nonlinear battery system, which demonstrates the effectiveness of the algorithm.

Uncertain Dynamics and Robustness Analysis

Figure 11:
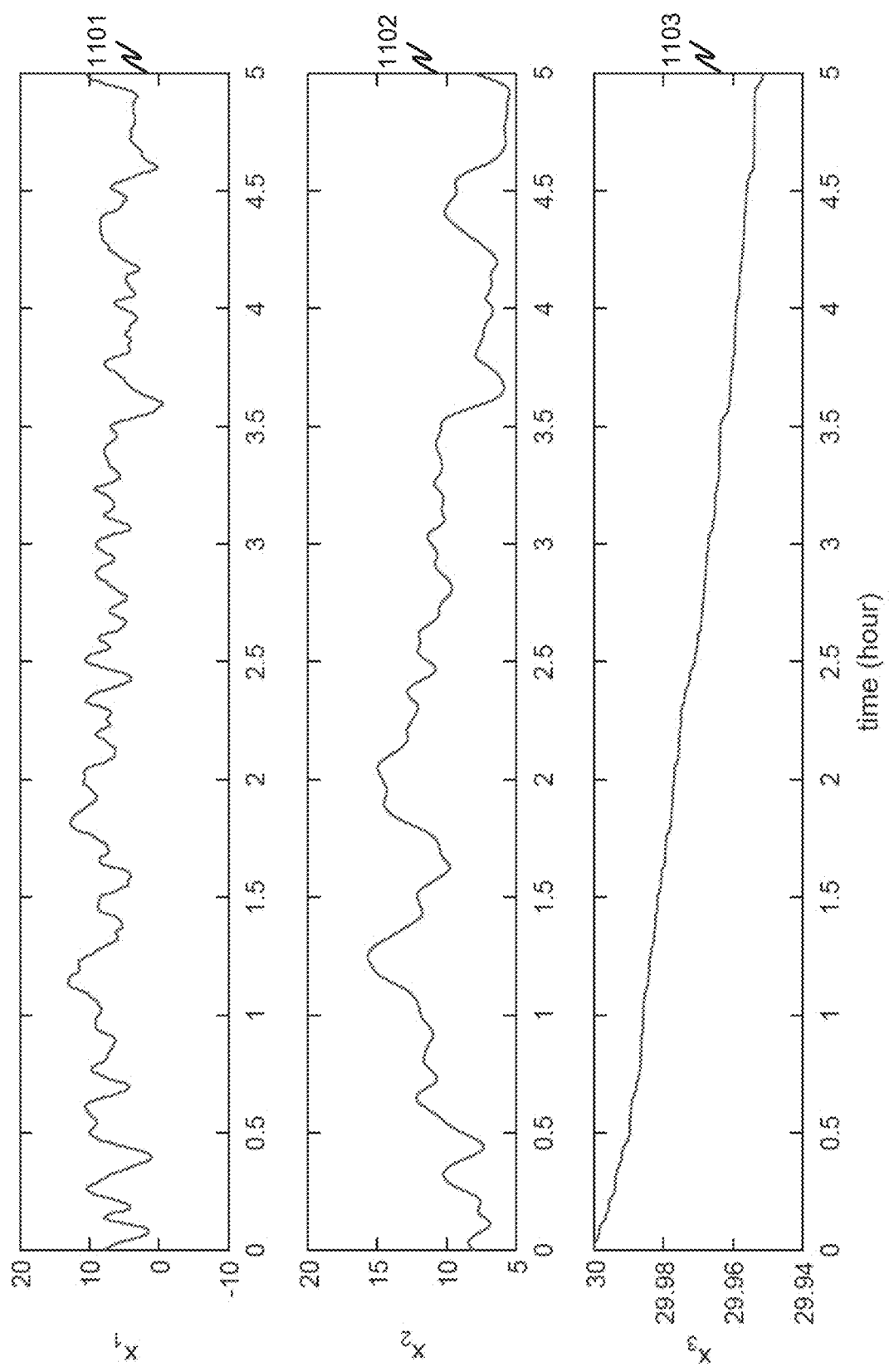
FIG. 11 is a graph in accordance with certain embodiments described herein.
Figure 12A:
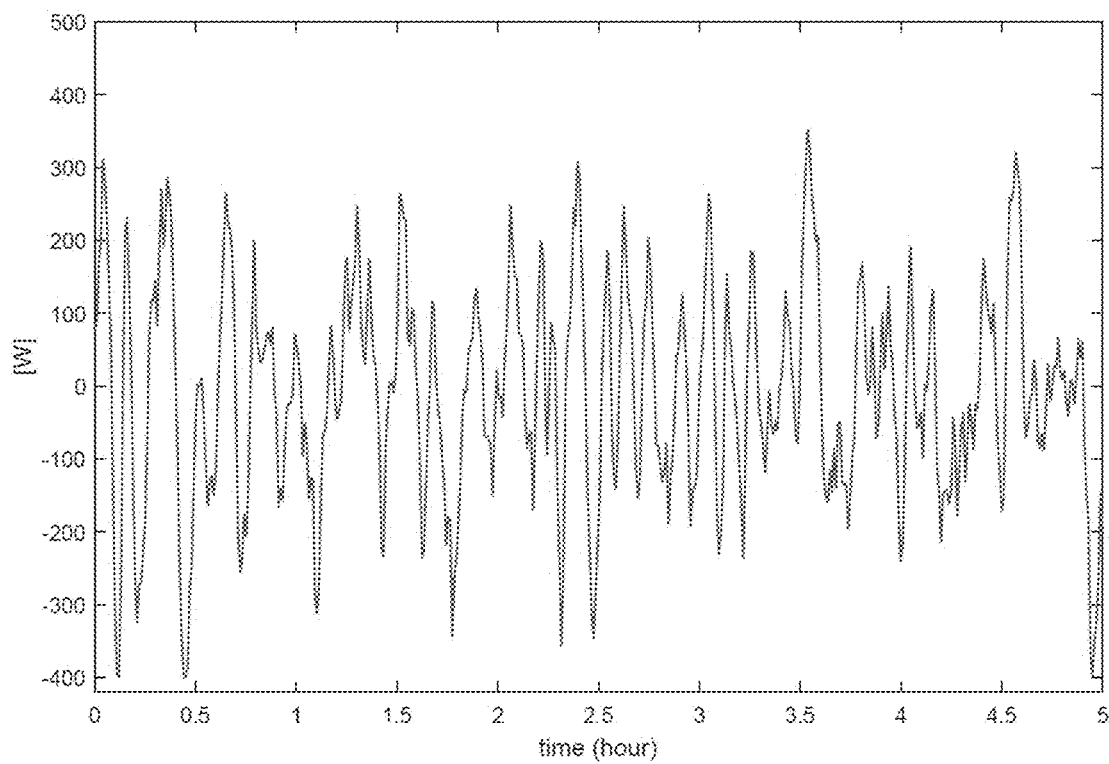
FIG. 12A is a graph in accordance with certain embodiments described herein.
Figure 12B:
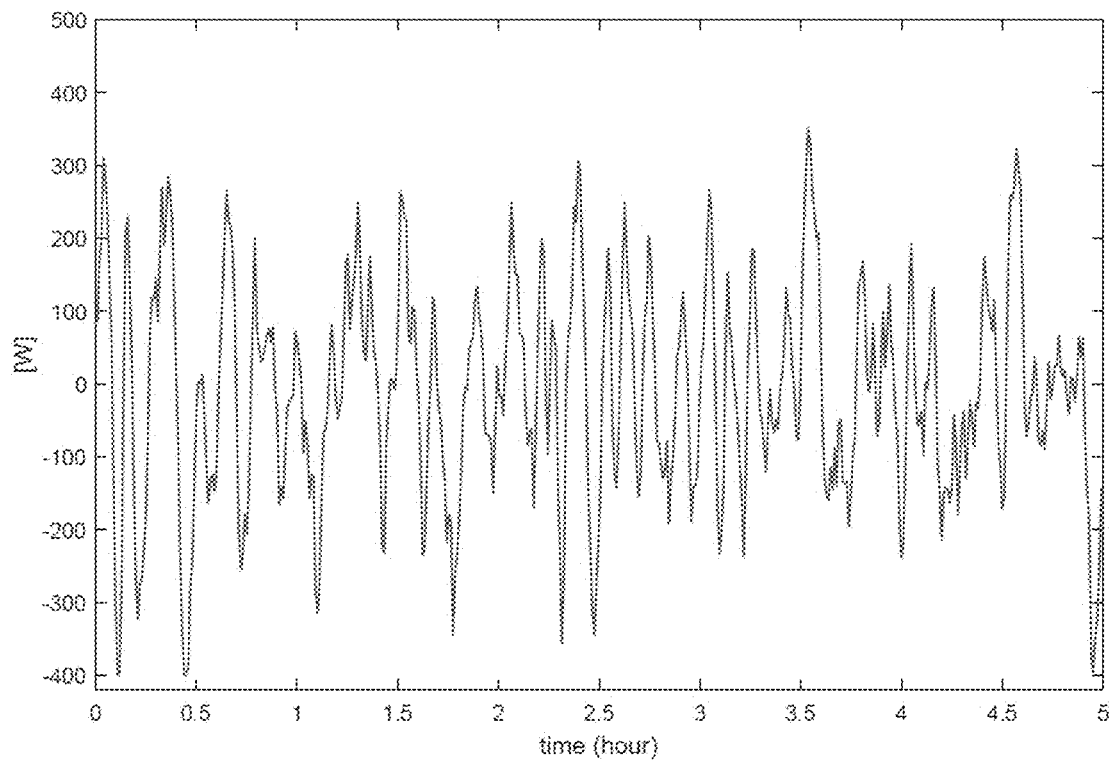
FIG. 12B is a graph in accordance with certain embodiments described herein.
Figure 13:
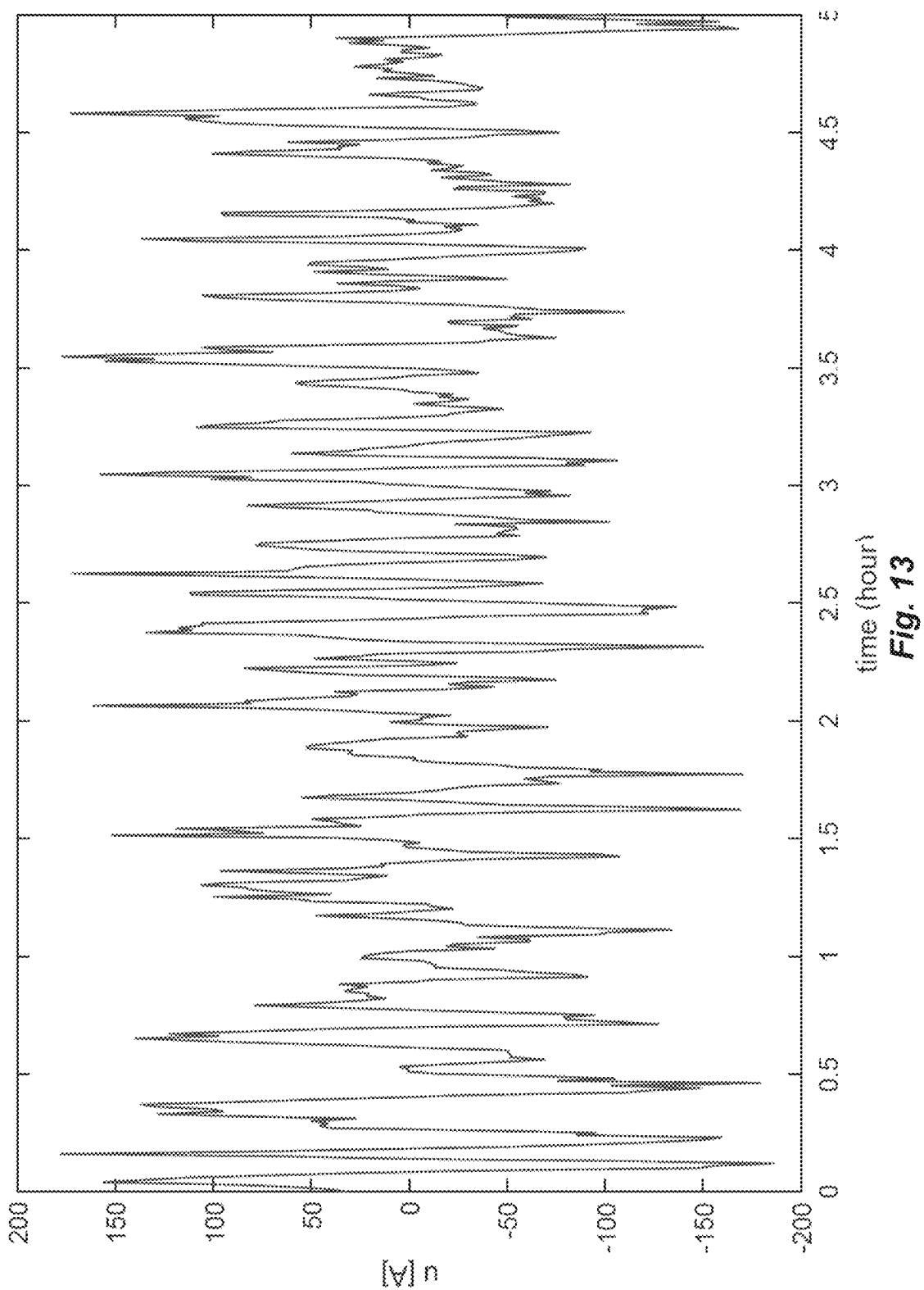
FIG. 13 is a graph in accordance with certain embodiments described herein.

Next, the impact of estimation error and model mismatch on the proposed real-time nonlinear receding horizon control strategy by introducing the additive disturbances, as discussed in Mathieu, is considered and illustrated in FIGS. 11-13. The nonlinear battery model with disturbances may be defined as:

$$\dot{x}_1=ax_1+bx_2-u+w_1,$$

$$\dot{x}_2=ax_1-bx_2+w_2,$$

$$\dot{x}_3=-(d_1(S-d_2)^2+d_3u^2)x_3+w_3,$$

$$y_1=(e_1x_1+e_2+w_4)u-cu^2,$$

where $w_1 \sim N(4,3)$ and $w_2 \sim N(-4,3)$ are used to describe the estimation errors in the states $x_1$ and $x_2$, and $w_3 \sim N(0,0.05)$ and $w_4 \sim N(-0.2,0.5)$ are used to describe the model mismatch in the degradation dynamics and open circuit voltage. With the same initial conditions, the same reference signal and the same horizon function as used above with regard to the discussion of FIGS. 8-10, the weighting matrices in the performance index may be defined as $Q_1=1000$, $Q_2=1$ and $R=10$ and the stable matrix may be designed as $A_s=-100I_3$.

FIGS. 11-13 illustrate results with the given disturbances by implementing the proposed real-time nonlinear receding horizon control methodology.

FIG. 11 illustrates the charge in two charge wells and battery with the introduction of additive disturbances. Charge over time in a first charge well, $x_1(t)$, 1101, the charge in a second charge well, $x_2(t)$, 1102, and the charge in the battery, $x_3(t)$, 1103, measured in Amp hours with the introduction of additive disturbances are plotted in the three graphs of FIG. 11.

FIG. 12A illustrates the desired trajectory of the output power, $y_r(t)$, with disturbances, while FIG. 12B shows the tracking performance of the realized output power, $y_1(t)$. The similarities of FIG. 12A and FIG. 12B show that actual signal is closely following the desired trajectory successfully even with the additive disturbances.

FIG. 13 illustrates the input current, u, measured in Amps, over time with the inclusion of additive disturbances. Here, even if the perturbed dynamics performs worse than the nominal case, illustrated in FIG. 10, better performance is achieved than with the results associated with other approaches, which is another advantage of the real-time nonlinear receding horizon control methodology disclosed herein.

Compared with the results of other approaches, the presently disclosed nonlinear receding horizon control methodology accomplishes the same objectives with better performance explicitly based on the nonlinear battery model in real time without resorting to any linearization and iteration techniques. Thus the proposed framework applied to nonlinear and/or uncertain nonlinear battery management/control problem is clearly significant.

Any of the steps, functions, and operations discussed herein can be performed continuously and automatically.

The exemplary systems and methods of this disclosure have been described in relation to vehicle systems and electric vehicles. However, to avoid unnecessarily obscuring the present disclosure, the preceding description omits a number of known structures and devices. This omission is not to be construed as a limitation of the scope of the claimed disclosure. Specific details are set forth to provide an understanding of the present disclosure. It should, however, be appreciated that the present disclosure may be practiced in a variety of ways beyond the specific detail set forth herein.

Furthermore, while the exemplary embodiments illustrated herein show the various components of the system collocated, certain components of the system can be located remotely, at distant portions of a distributed network, such as a LAN and/or the Internet, or within a dedicated system. Thus, it should be appreciated, that the components of the system can be combined into one or more devices, such as a server, communication device, or collocated on a particular node of a distributed network, such as an analog and/or digital telecommunications network, a packet-switched network, or a circuit-switched network. It will be appreciated from the preceding description, and for reasons of computational efficiency, that the components of the system can be arranged at any location within a distributed network of components without affecting the operation of the system.

Furthermore, it should be appreciated that the various links connecting the elements can be wired or wireless links, or any combination thereof, or any other known or later developed element(s) that is capable of supplying and/or communicating data to and from the connected elements. These wired or wireless links can also be secure links and may be capable of communicating encrypted information. Transmission media used as links, for example, can be any suitable carrier for electrical signals, including coaxial cables, copper wire, and fiber optics, and may take the form of acoustic or light waves, such as those generated during radio-wave and infra-red data communications.

While the flowcharts have been discussed and illustrated in relation to a particular sequence of events, it should be appreciated that changes, additions, and omissions to this sequence can occur without materially affecting the operation of the disclosed embodiments, configuration, and aspects.

A number of variations and modifications of the disclosure can be used. It would be possible to provide for some features of the disclosure without providing others.

In yet another embodiment, the systems and methods of this disclosure can be implemented in conjunction with a special purpose computer, a programmed microprocessor or microcontroller and peripheral integrated circuit element(s), an ASIC or other integrated circuit, a digital signal processor, a hard-wired electronic or logic circuit such as discrete element circuit, a programmable logic device or gate array such as PLD, PLA, FPGA, PAL, special purpose computer, any comparable means, or the like. In general, any device(s) or means capable of implementing the methodology illustrated herein can be used to implement the various aspects of this disclosure. Exemplary hardware that can be used for the present disclosure includes computers, handheld devices, telephones (e.g., cellular, Internet enabled, digital, analog, hybrids, and others), and other hardware known in the art. Some of these devices include processors (e.g., a single or multiple microprocessors), memory, nonvolatile storage, input devices, and output devices. Furthermore, alternative software implementations including, but not limited to, distributed processing or component/object distributed processing, parallel processing, or virtual machine processing can also be constructed to implement the methods described herein.

In yet another embodiment, the disclosed methods may be readily implemented in conjunction with software using object or object-oriented software development environments that provide portable source code that can be used on a variety of computer or workstation platforms. Alternatively, the disclosed system may be implemented partially or fully in hardware using standard logic circuits or VLSI design. Whether software or hardware is used to implement the systems in accordance with this disclosure is dependent on the speed and/or efficiency requirements of the system, the particular function, and the particular software or hardware systems or microprocessor or microcomputer systems being utilized.

In yet another embodiment, the disclosed methods may be partially implemented in software that can be stored on a storage medium, executed on programmed general-purpose computer with the cooperation of a controller and memory, a special purpose computer, a microprocessor, or the like. In these instances, the systems and methods of this disclosure can be implemented as a program embedded on a personal computer such as an applet, JAVA® or CGI script, as a resource residing on a server or computer workstation, as a routine embedded in a dedicated measurement system, system component, or the like. The system can also be implemented by physically incorporating the system and/or method into a software and/or hardware system.

Although the present disclosure describes components and functions implemented in the embodiments with reference to particular standards and protocols, the disclosure is not limited to such standards and protocols. Other similar standards and protocols not mentioned herein are in existence and are considered to be included in the present disclosure. Moreover, the standards and protocols mentioned herein and other similar standards and protocols not mentioned herein are periodically superseded by faster or more effective equivalents having essentially the same functions. Such replacement standards and protocols having the same functions are considered equivalents included in the present disclosure.

The present disclosure, in various embodiments, configurations, and aspects, includes components, methods, processes, systems and/or apparatus substantially as depicted and described herein, including various embodiments, subcombinations, and subsets thereof. Those of skill in the art will understand how to make and use the systems and methods disclosed herein after understanding the present disclosure. The present disclosure, in various embodiments, configurations, and aspects, includes providing devices and processes in the absence of items not depicted and/or described herein or in various embodiments, configurations, or aspects hereof, including in the absence of such items as may have been used in previous devices or processes, e.g., for improving performance, achieving ease, and/or reducing cost of implementation.

The foregoing discussion of the disclosure has been presented for purposes of illustration and description. The foregoing is not intended to limit the disclosure to the form or forms disclosed herein. In the foregoing Detailed Description for example, various features of the disclosure are grouped together in one or more embodiments, configurations, or aspects for the purpose of streamlining the disclosure. The features of the embodiments, configurations, or aspects of the disclosure may be combined in alternate embodiments, configurations, or aspects other than those discussed above. This method of disclosure is not to be interpreted as reflecting an intention that the claimed disclosure requires more features than are expressly recited in each claim. Rather, as the following claims reflect, inventive aspects lie in less than all features of a single foregoing disclosed embodiment, configuration, or aspect. Thus, the following claims are hereby incorporated into this Detailed Description, with each claim standing on its own as a separate preferred embodiment of the disclosure.

Moreover, though the description of the disclosure has included description of one or more embodiments, configurations, or aspects and certain variations and modifications, other variations, combinations, and modifications are within the scope of the disclosure, e.g., as may be within the skill and knowledge of those in the art, after understanding the present disclosure. It is intended to obtain rights, which include alternative embodiments, configurations, or aspects to the extent permitted, including alternate, interchangeable and/or equivalent structures, functions, ranges, or steps to those claimed, whether or not such alternate, interchangeable and/or equivalent structures, functions, ranges, or steps are disclosed herein, and without intending to publicly dedicate any patentable subject matter.

Embodiments include a computer implemented method for controlling nonlinear battery degradation through real-time nonlinear receding horizon control, the method comprising steps for: determining, by a processor, a current time; determining, by the processor, a current state of charge of a battery; integrating a two-point boundary value problem from the current time to an optimization horizon time; obtaining, by the processor, based on the integrated two-point boundary value problem, a differential equation of a costate associated with the charge of the battery; integrating, by the processor, the differential equation of the costate in real-time; computing, by the processor, a distributed optimal control protocol for controlling a degradation of the battery; and generating, by the processor, a real time optimal control scheme based on the distributed optimal control protocol.

Aspects of the above method include wherein the real time optimal control scheme tracks a desired trajectory for the degradation of the battery.

Aspects of the above method include wherein the real time optimal control scheme reduces a rate of the degradation of the battery.

Aspects of the above method include implementing, by the processor, a backward sweep method.

Aspects of the above method include wherein no approximation technique is used.

Aspects of the above method include wherein the real time optimal control scheme comprises inequality constraints.

Aspects of the above method include wherein the real time optimal control scheme remains asymptotically stable.

Embodiments include a system for controlling nonlinear battery degradation through real-time nonlinear receding horizon control, the system comprising: a battery; processor; and a computer-readable storage medium storing computer-readable instructions, which when executed by the processor, cause the processor to perform operations comprising: determining a current time; determining a current state of charge of a battery; integrating a two-point boundary value problem from the current time to an optimization horizon time; obtaining, based on the integrated two-point boundary value problem, a differential equation of a costate associated with the charge of the battery; integrating the differential equation of the costate in real-time; computing a distributed optimal control protocol for controlling a degradation of the battery; and generating a real time optimal control scheme based on the distributed optimal control protocol.

Aspects of the above system include wherein the real time optimal control scheme tracks a desired trajectory for the degradation of the battery.

Aspects of the above system include wherein the real time optimal control scheme reduces a rate of the degradation of the battery.

Aspects of the above system include wherein the operations further comprise implementing a backward sweep method.

Aspects of the above system include wherein no approximation technique is used.

Aspects of the above system include wherein the real time optimal control scheme comprises inequality constraints.

Aspects of the above system include wherein the real time optimal control scheme remains asymptotically stable.

Embodiments include a computer program product for controlling nonlinear battery degradation through real-time nonlinear receding horizon control, comprising: a non-transitory computer readable storage medium having computer readable program code embodied therewith, the computer readable program code configured, when executed by a processor, to: determine a current time; determine a current state of charge of a battery; integrate a two-point boundary value problem from the current time to an optimization horizon time; obtain, based on the integrated two-point boundary value problem, a differential equation of a costate associated with the charge of the battery; integrate the differential equation of the costate in real-time; compute a distributed optimal control protocol for controlling a degradation of the battery; and generate a real time optimal control scheme based on the distributed optimal control protocol.

Aspects of the above computer program product include wherein the real time optimal control scheme tracks a desired trajectory for the degradation of the battery.

Aspects of the above computer program product include wherein the real time optimal control scheme reduces a rate of the degradation of the battery.

Aspects of the above computer program product include wherein the computer readable program code is further configured, when executed by the processor, to implement a backward sweep method.

Aspects of the above computer program product include wherein no approximation technique is used.

Aspects of the above computer program product include wherein the real time optimal control scheme comprises inequality constraints.

Any one or more of the aspects/embodiments as substantially disclosed herein.

Any one or more of the aspects/embodiments as substantially disclosed herein optionally in combination with any one or more other aspects/embodiments as substantially disclosed herein.

One or means adapted to perform any one or more of the above aspects/embodiments as substantially disclosed herein.

The phrases "at least one," "one or more," "or," and "and/or" are open-ended expressions that are both conjunctive and disjunctive in operation. For example, each of the expressions "at least one of A, B and C," "at least one of A, B, or C," "one or more of A, B, and C," "one or more of A, B, or C," "A, B, and/or C," and "A, B, or C" means A alone, B alone, C alone, A and B together, A and C together, B and C together, or A, B and C together.

The term "a" or "an" entity refers to one or more of that entity. As such, the terms "a" (or "an"), "one or more," and "at least one" can be used interchangeably herein. It is also to be noted that the terms "comprising," "including," and "having" can be used interchangeably.

The term "automatic" and variations thereof, as used herein, refers to any process or operation, which is typically continuous or semi-continuous, done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Aspects of the present disclosure may take the form of an embodiment that is entirely hardware, an embodiment that is entirely software (including firmware, resident software, micro-code, etc.) or an embodiment combining software and hardware aspects that may all generally be referred to herein as a "circuit," "module," or "system." Any combination of one or more computer-readable medium(s) may be utilized. The computer-readable medium may be a computer-readable signal medium or a computer-readable storage medium.

A computer-readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer-readable storage medium would include the following: an electrical connection having one or more wires, a portable computer diskette, a hard disk, a random access memory (RAM), a read-only memory (ROM), an erasable programmable read-only memory (EPROM or Flash memory), an optical fiber, a portable compact disc read-only memory (CD-ROM), an optical storage device, a magnetic storage device, or any suitable combination of the foregoing. In the context of this document, a computer-readable storage medium may be any tangible medium that can contain or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electromagnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable medium may be transmitted using any appropriate medium, including, but not limited to, wireless, wireline, optical fiber cable, RF, etc., or any suitable combination of the foregoing.

The terms "determine," "calculate," "compute," and variations thereof, as used herein, are used interchangeably and include any type of methodology, process, mathematical operation or technique.

The term "electric vehicle" (EV), also referred to herein as an electric drive vehicle, may use one or more electric motors or traction motors for propulsion. An electric vehicle may be powered through a collector system by electricity from off-vehicle sources, or may be self-contained with a battery or generator to convert fuel to electricity. An electric vehicle generally includes a rechargeable electricity storage system (RESS) (also called Full Electric Vehicles (FEV)). Power storage methods may include: chemical energy stored on the vehicle in on-board batteries (e.g., battery electric vehicle or BEV), on board kinetic energy storage (e.g., flywheels), and/or static energy (e.g., by on-board double-layer capacitors). Batteries, electric double-layer capacitors, and flywheel energy storage may be forms of rechargeable on-board electrical storage.

The term "hybrid electric vehicle" refers to a vehicle that may combine a conventional (usually fossil fuel-powered) powertrain with some form of electric propulsion. Most hybrid electric vehicles combine a conventional internal combustion engine (ICE) propulsion system with an electric propulsion system (hybrid vehicle drivetrain). In parallel hybrids, the ICE and the electric motor are both connected to the mechanical transmission and can simultaneously transmit power to drive the wheels, usually through a conventional transmission. In series hybrids, only the electric motor drives the drivetrain, and a smaller ICE works as a generator to power the electric motor or to recharge the batteries. Power-split hybrids combine series and parallel characteristics. A full hybrid, sometimes also called a strong hybrid, is a vehicle that can run on just the engine, just the batteries, or a combination of both. A mid hybrid is a vehicle that cannot be driven solely on its electric motor, because the electric motor does not have enough power to propel the vehicle on its own.

The term "rechargeable electric vehicle" or "REV" refers to a vehicle with on board rechargeable energy storage, including electric vehicles and hybrid electric vehicles.

What is claimed is:

1. A computer-implemented method for controlling nonlinear battery degradation through real-time nonlinear receding horizon control, the method comprising steps for:
    determining, by a processor, a current time;
    determining, by the processor, a current state of charge of a battery;
    integrating, by the processor, a two-point boundary value problem from the current time to an optimization horizon time;
    obtaining, by the processor, based on the integrated two-point boundary value problem, a differential equation of a costate associated with the current state of charge of the battery;
    integrating, by the processor, the differential equation of the costate in real-time;
    computing, by the processor, a distributed optimal control protocol for controlling a degradation of the battery; and
    generating, by the processor, a real-time optimal control scheme based on the distributed optimal control protocol, wherein the real-time optimal control scheme is used by the processor to adjust an output power of the battery to track a desired trajectory for the output power of the battery.

2. The method of claim 1, wherein the real-time optimal control scheme tracks a desired trajectory for the degradation of the battery.

3. The method of claim 1, wherein the real-time optimal control scheme reduces a rate of the degradation of the battery.

4. The method of claim 1, further comprising implementing, by the processor, a backward sweep method.

5. The method of claim 1, wherein no approximation technique is used.

6. The method of claim 1, wherein the real-time optimal control scheme comprises inequality constraints.

7. The method of claim 1, wherein the real-time optimal control scheme remains asymptotically stable.

8. A system for controlling nonlinear battery degradation through real-time nonlinear receding horizon control, the system comprising:
    a battery;
    processor; and
    a computer-readable storage medium storing computer-readable instructions, which when executed by the processor, cause the processor to perform operations comprising:
    determining a current time;
    determining a current state of charge of a battery;
    integrating a two-point boundary value problem from the current time to an optimization horizon time;
    obtaining, based on the integrated two-point boundary value problem, a differential equation of a costate associated with the state of charge of the battery;
    integrating the differential equation of the costate in real-time;
    computing a distributed optimal control protocol for controlling a degradation of the battery; and
    generating a real-time optimal control scheme based on the distributed optimal control protocol, wherein the real-time optimal control scheme is used by the processor to adjust an output power of the battery to track a desired trajectory for the output power of the battery.

9. The system of claim 8, wherein the real-time optimal control scheme tracks a desired trajectory for the degradation of the battery.

10. The system of claim 8, wherein the real-time optimal control scheme reduces a rate of the degradation of the battery.

11. The system of claim 8, wherein the operations further comprise implementing a backward sweep method.

12. The system of claim 8, wherein no approximation technique is used.

13. The system of claim 8, wherein the real-time optimal control scheme comprises inequality constraints.

14. The system of claim 8, wherein the real-time optimal control scheme remains asymptotically stable.

15. A computer program product for controlling nonlinear battery degradation through real-time nonlinear receding horizon control, comprising:
- a non-transitory computer readable storage medium having computer-readable program code embodied therewith, the computer-readable program code configured, when executed by a processor, to:
- determine a current time;
- determine a current state of charge of a battery;
- integrate a two-point boundary value problem from the current time to an optimization horizon time;
- obtain, based on the integrated two-point boundary value problem, a differential equation of a costate associated with the state of charge of the battery;
- integrate the differential equation of the costate in real-time;
- compute a distributed optimal control protocol for controlling a degradation of the battery; and
- generate a real-time optimal control scheme based on the distributed optimal control protocol, wherein the real-time optimal control scheme is used by the processor to adjust an output power of the battery to track a desired trajectory for the output power of the battery.

16. The computer program product of claim 15, wherein the real-time optimal control scheme tracks a desired trajectory for the degradation of the battery.

17. The computer program product of claim 15, wherein the real-time optimal control scheme reduces a rate of the degradation of the battery.

18. The computer program product of claim 15, wherein the computer-readable program code is further configured, when executed by the processor, to implement a backward sweep method.

19. The computer program product of claim 15, wherein no approximation technique is used.

20. The computer program product of claim 15, wherein the real-time optimal control scheme comprises inequality constraints.

* * * * *